US009927512B2

United States Patent
Rowe et al.

(10) Patent No.: US 9,927,512 B2
(45) Date of Patent: Mar. 27, 2018

(54) METHOD AND SYSTEM FOR ULTRASONIC SIGNALING, RANGING AND LOCATION TRACKING

(71) Applicant: CARNEGIE MELLON UNIVERSITY, Center for Technology Transfer and Enterprise Creation, Pittsburgh, PA (US)

(72) Inventors: Anthony Rowe, Pittsburgh, PA (US); Patrick Lazik, Pittsburgh, PA (US)

(73) Assignee: Carnegie Mellon University, a Pennsylvania Non-Profit Corporation, Pittsburgh, PA (US)

( * ) Notice: Subject to any disclaimer, the term of this patent is extended or adjusted under 35 U.S.C. 154(b) by 906 days.

(21) Appl. No.: 14/152,665

(22) Filed: Jan. 10, 2014

(65) Prior Publication Data

US 2014/0192622 A1    Jul. 10, 2014

Related U.S. Application Data

(60) Provisional application No. 61/751,080, filed on Jan. 10, 2013.

(51) Int. Cl.
*G01S 5/18* (2006.01)
*G01S 1/72* (2006.01)
(Continued)

(52) U.S. Cl.
CPC ............... *G01S 5/18* (2013.01); *G01S 1/725* (2013.01); *G01S 1/74* (2013.01); *G01S 5/0036* (2013.01); *G01S 5/28* (2013.01)

(58) Field of Classification Search
CPC ... H02N 1/08; H02N 1/00; A61B 8/00; A61B 8/4483; A61B 8/4494; B06B 1/0607
See application file for complete search history.

(56) References Cited

U.S. PATENT DOCUMENTS

| 4,578,783 | A | * | 3/1986 | Iwata | ................... G01S 15/102 367/138 |
| 5,943,295 | A | * | 8/1999 | Varga | ...................... G01S 15/04 280/735 |

(Continued)

FOREIGN PATENT DOCUMENTS

| CN | 101753497 A | * | 6/2010 |
| WO | 20130108243 A1 | | 7/2013 |

OTHER PUBLICATIONS

Schweinzer, Ultrasonic device localization and its potential for wireless sensor network security; Feb. 20, 2009.*

*Primary Examiner* — Luke Ratcliffe
*Assistant Examiner* — Amie M N'Dure
(74) *Attorney, Agent, or Firm* — Michael G. Monyok; David G. Oberdick

(57) ABSTRACT

An indoor ultrasonic location tracking system that can utilize standard audio speakers to provide indoor ranging information to modern mobile devices like smartphones and tablets. The method uses a communication scheme based on linearly increasing frequency modulated chirps in the audio bandwidth just above the human hearing frequency range where mobile devices are still sensitive. The method uses gradual frequency and amplitude changes that minimize human perceivable (psychoacoustic) artifacts derived from the non-ideal impulse response of audio speakers. Chirps also benefit from Pulse Compression, which improves ranging resolution and resilience to both Doppler shifts and multi-path propagation that plague indoor environments. The method supports the decoding of multiple unique identifier packets simultaneously. A Time-Difference-of-Arrival pseudo-ranging technique allows for localization without explicit synchronization with the broadcasting infrastructure. An alternate received signal strength indicator based (Continued)

localization technique allows less accurate localization at the benefit of sparser transmission infrastructure.

17 Claims, 21 Drawing Sheets

(51) Int. Cl.
*G01S 1/74* (2006.01)
*G01S 5/00* (2006.01)
*G01S 5/28* (2006.01)

(56) References Cited

U.S. PATENT DOCUMENTS

| | | | |
|---|---|---|---|
| 6,202,034 B1* | 3/2001 | Li | G01S 7/527 367/87 |
| 6,243,323 B1* | 6/2001 | Li | G01S 15/102 367/138 |
| 6,678,510 B2 | 1/2004 | Syrjarinne et al. | |
| 7,916,577 B2 | 3/2011 | Jeong et al. | |
| 8,681,589 B2* | 3/2014 | Baeten | G01V 1/005 367/189 |
| 9,322,941 B2* | 4/2016 | Meunier | G01V 1/143 |
| 2003/0016174 A1* | 1/2003 | Anderson | G01S 5/02 342/378 |
| 2003/0093224 A1* | 5/2003 | Jeffryes | G01V 1/005 702/14 |
| 2007/0195644 A1* | 8/2007 | Marples | G01V 1/005 367/39 |
| 2009/0043504 A1 | 2/2009 | Bandyopadhyay et al. | |
| 2009/0190441 A1* | 7/2009 | Zhao | G01S 5/30 367/128 |
| 2011/0205842 A1* | 8/2011 | Baeten | G01V 1/005 367/37 |
| 2013/0201799 A1* | 8/2013 | Meunier | G01V 1/143 367/189 |

* cited by examiner

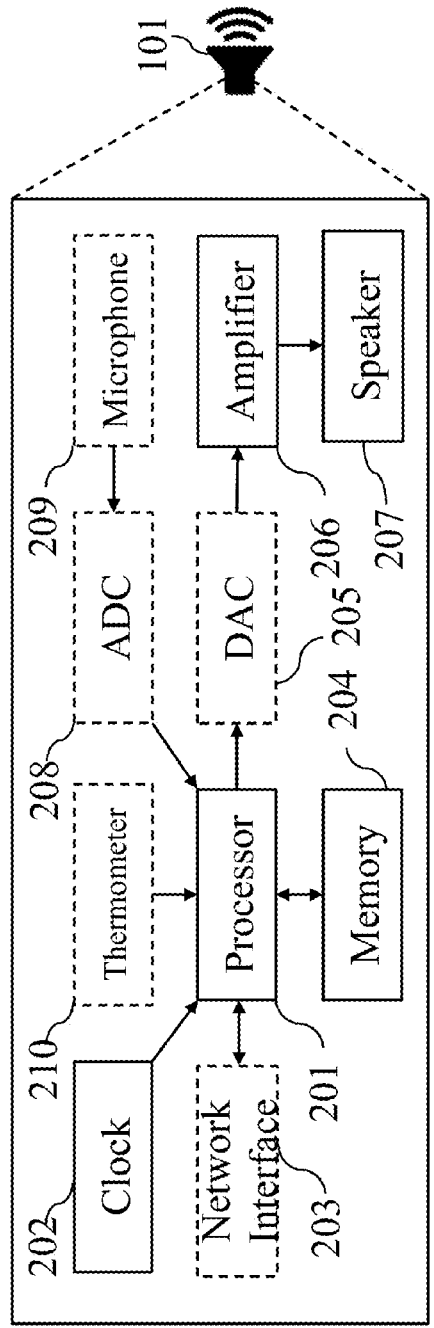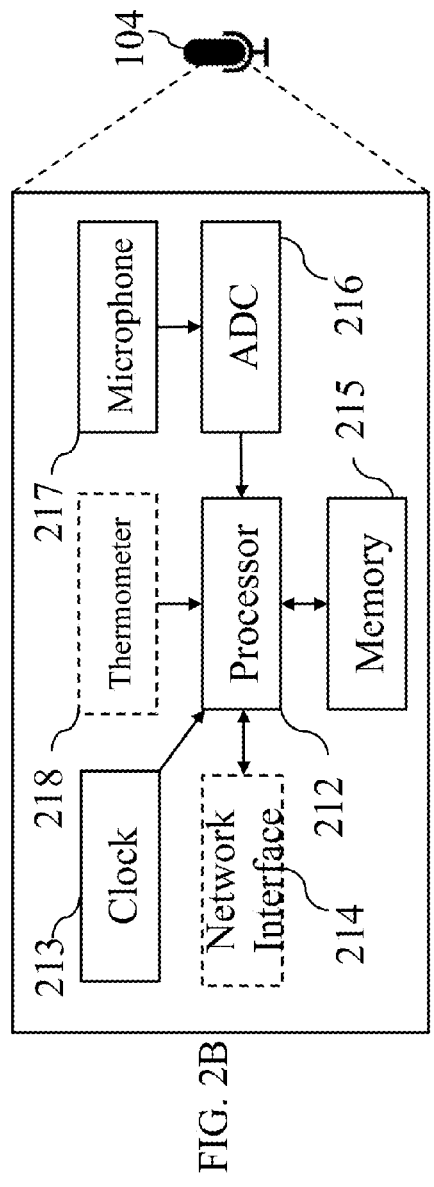
FIG. 2A  Transmitter Hardware Architecture
FIG. 2B  Receiver Hardware Architecture

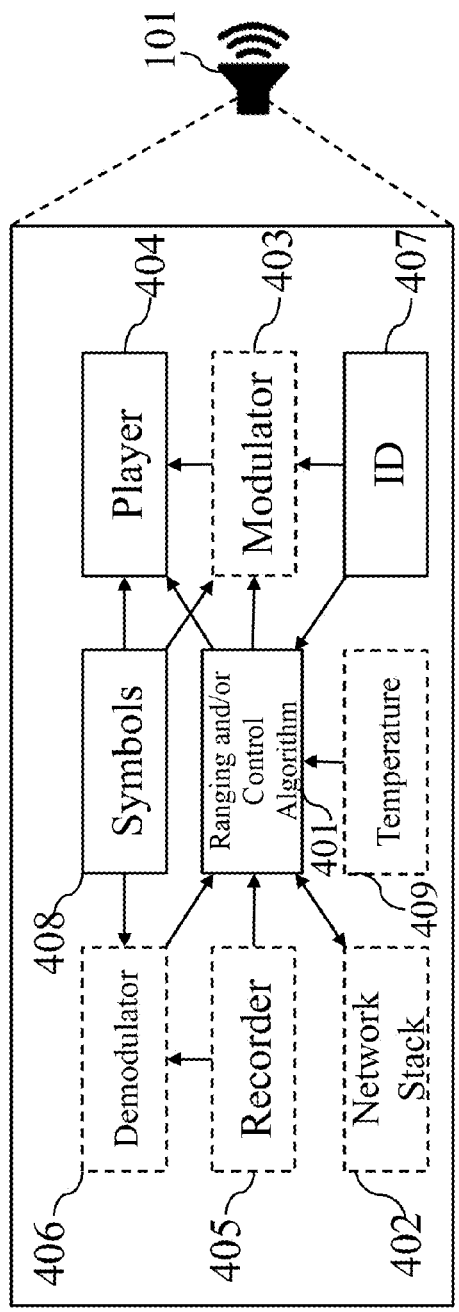
FIG. 4A  Transmitter Software Architecture
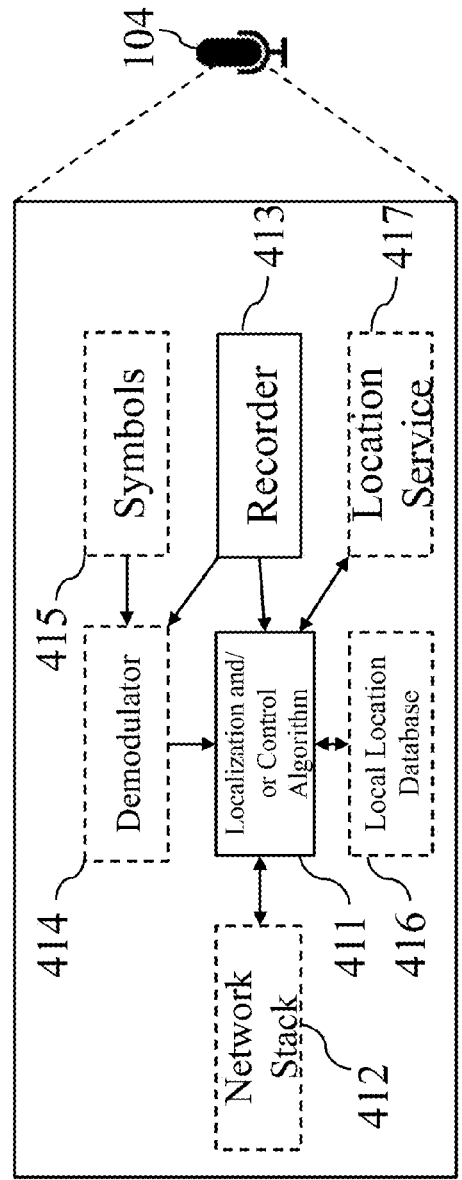
FIG. 4B  Receiver Software Architecture Server Software Architecture Time Synchronization Source Software Architecture

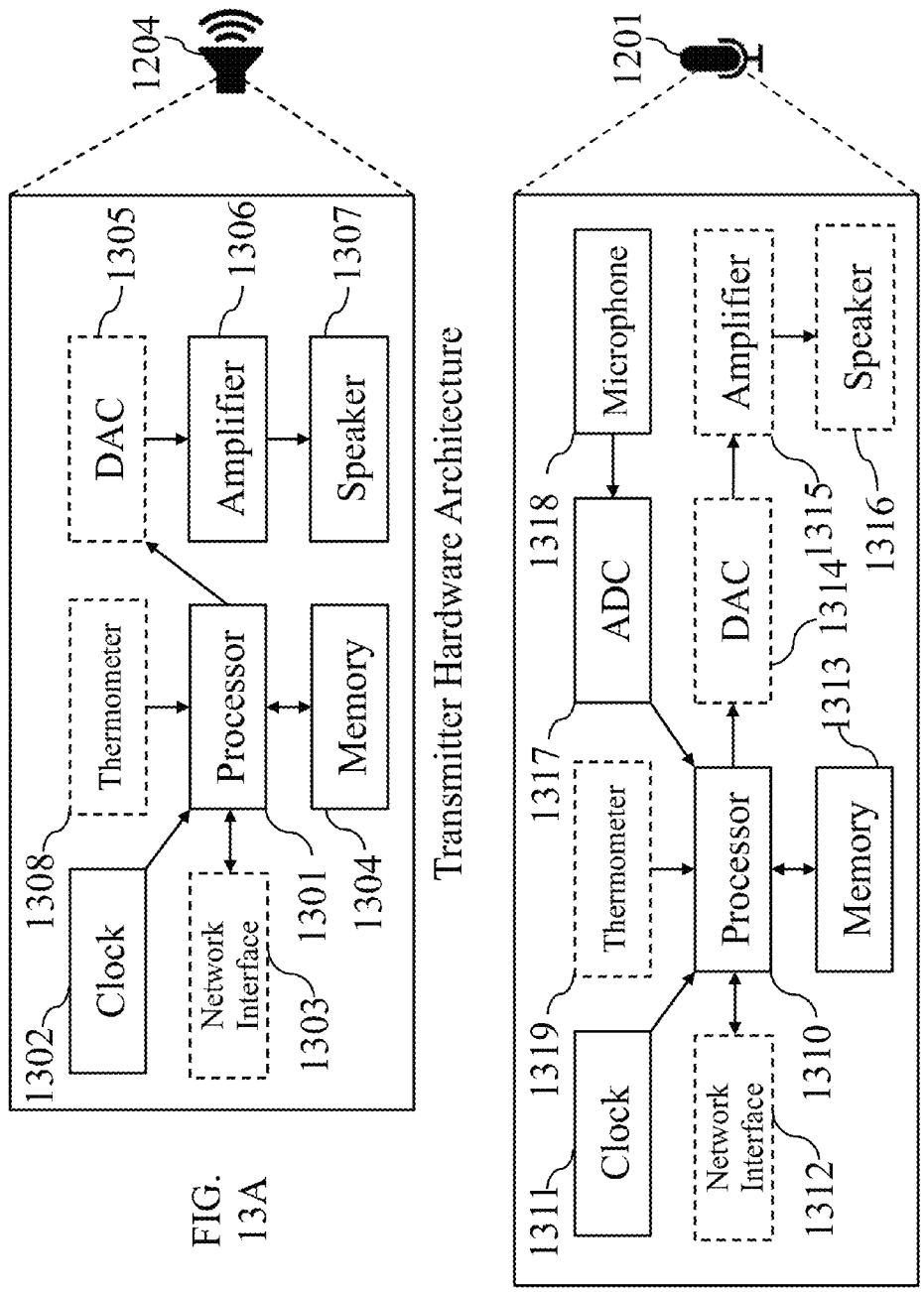
FIG. 13A    Transmitter Hardware Architecture
FIG. 13B    Receiver Hardware Architecture

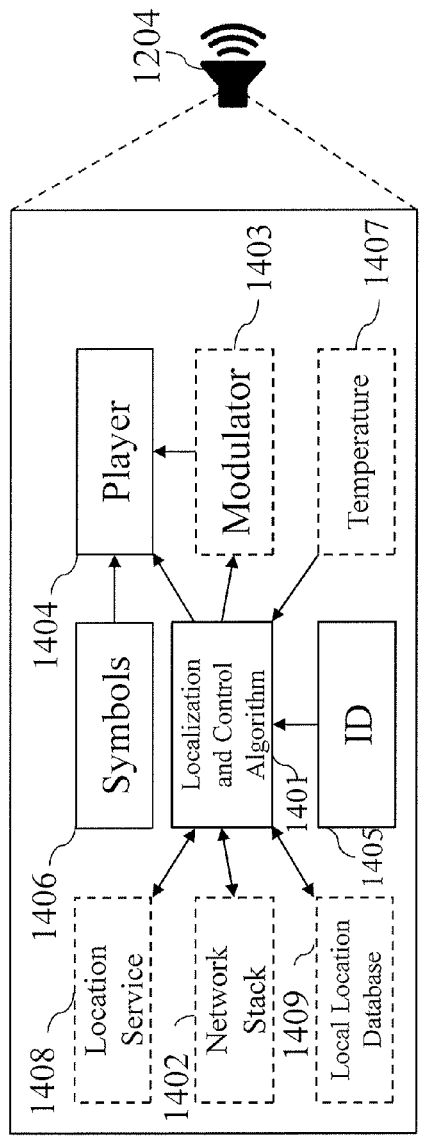
FIG. 14A Transmitter Software Architecture
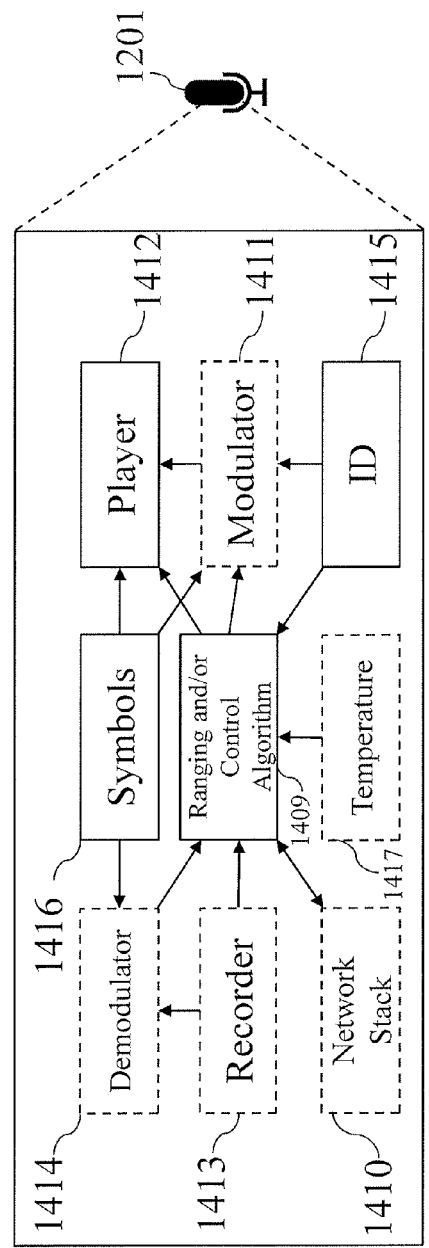
FIG. 14B Receiver Software Architecture

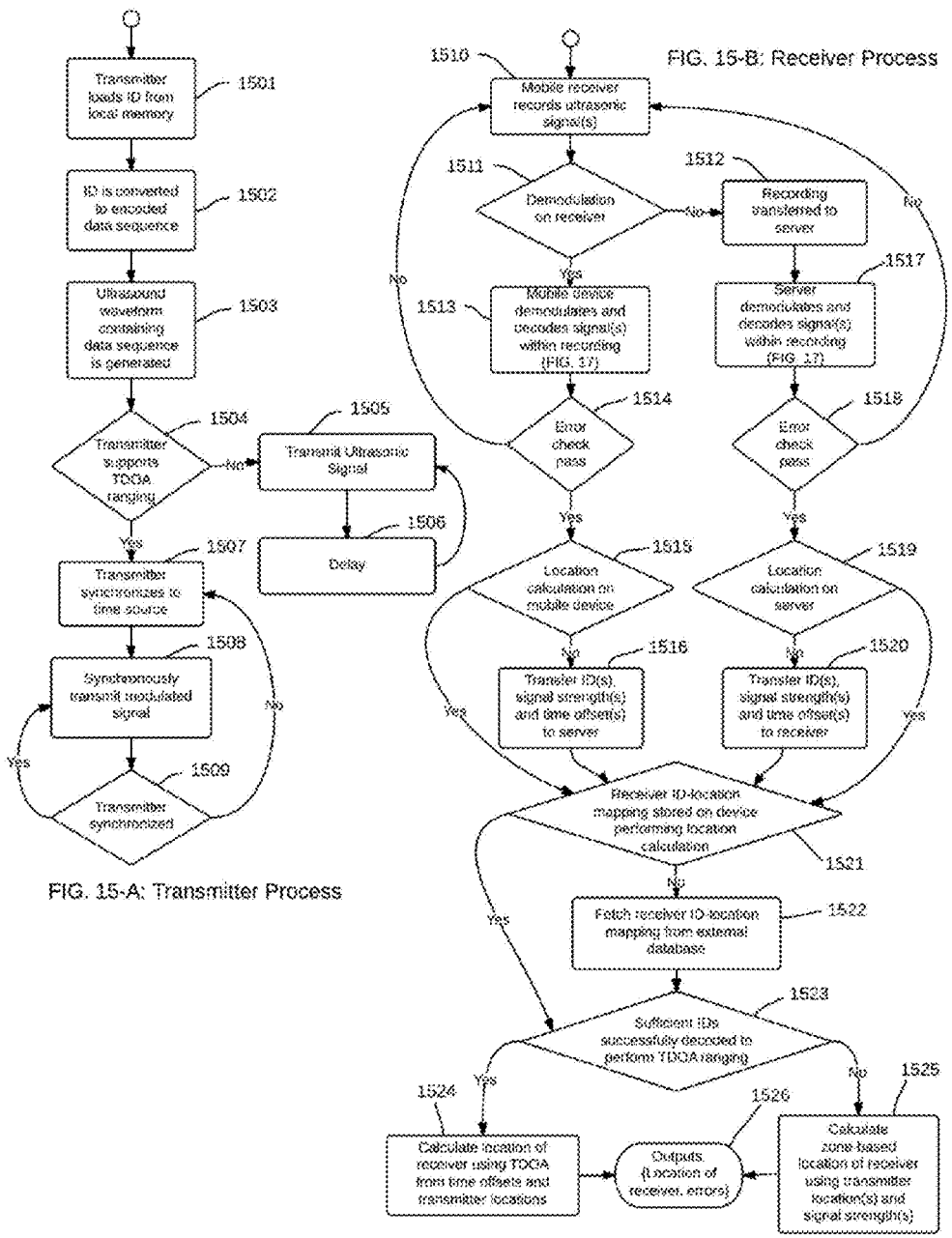

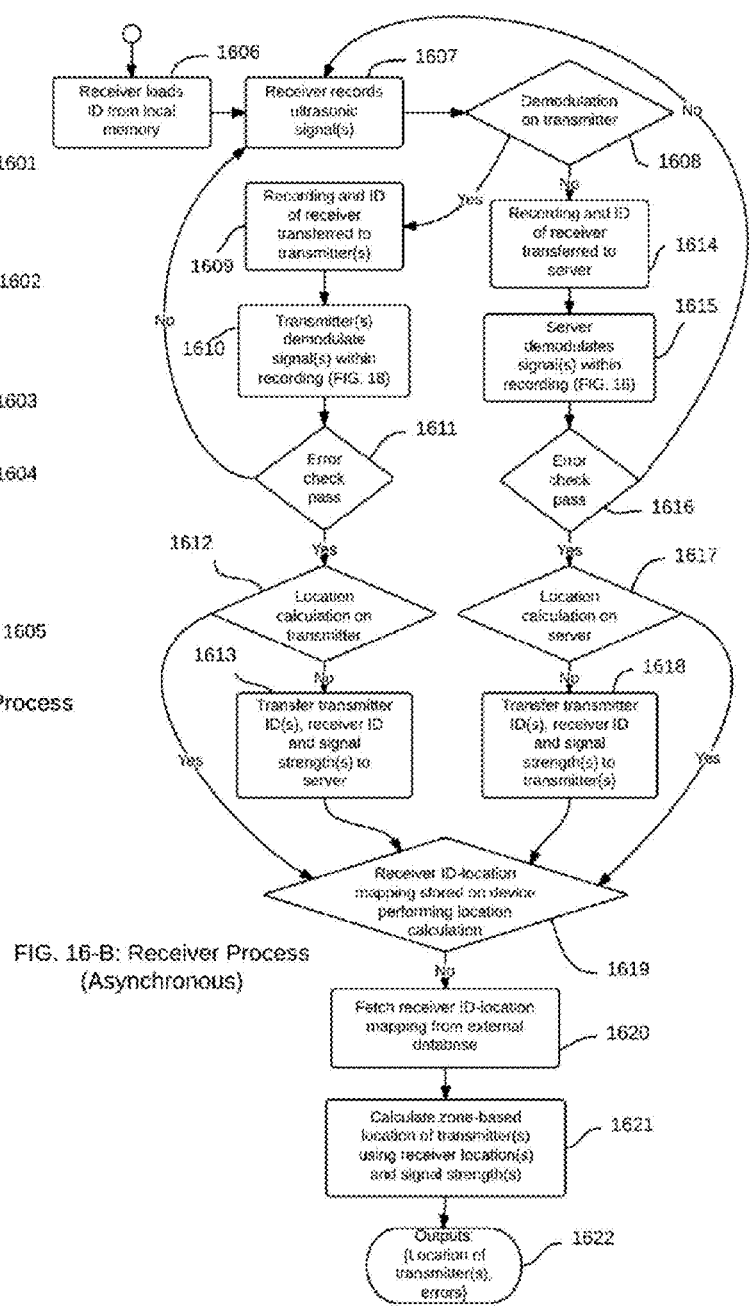
FIG. 16-A: Transmitter Process
FIG. 16-B: Receiver Process (Asynchronous)

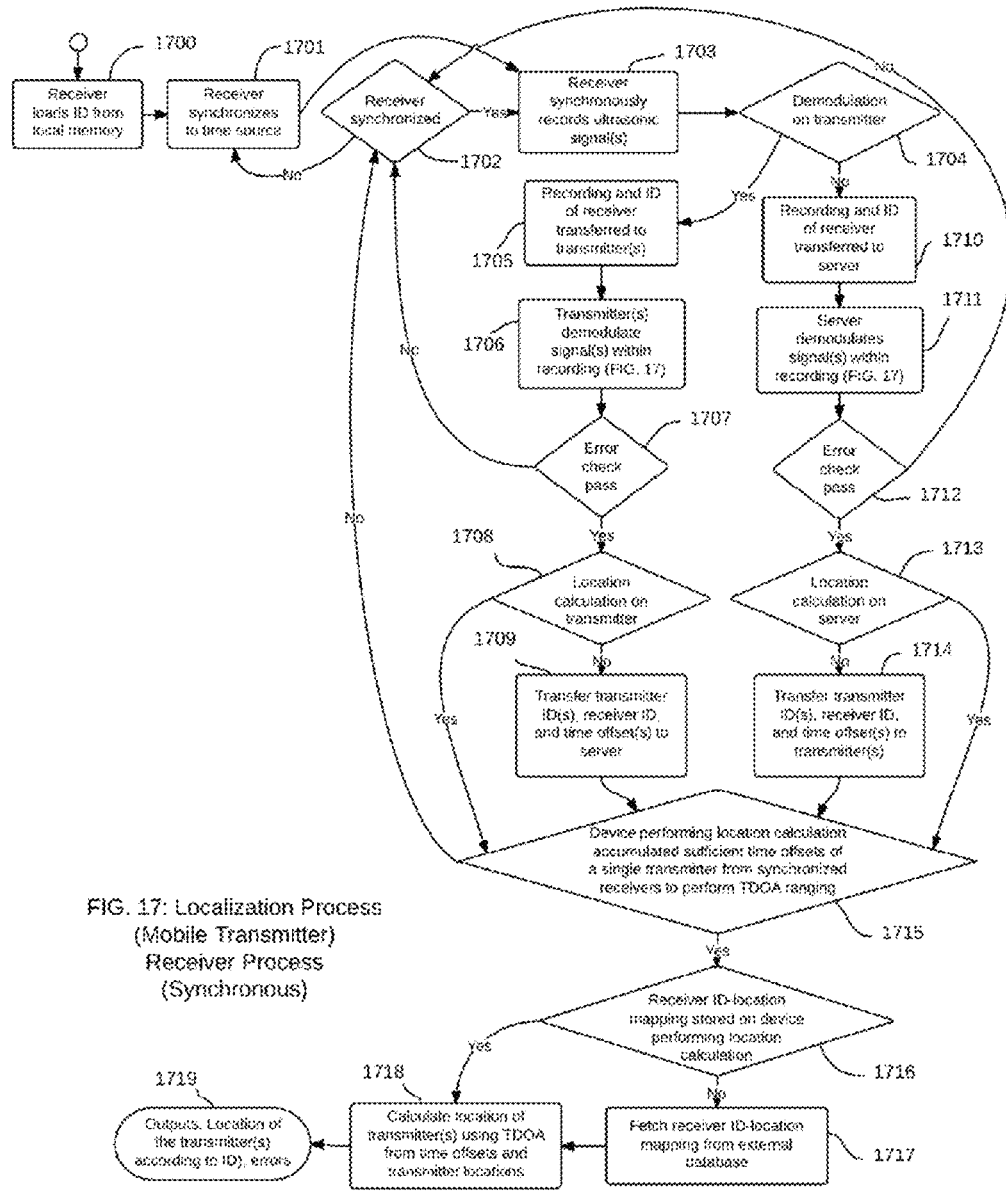

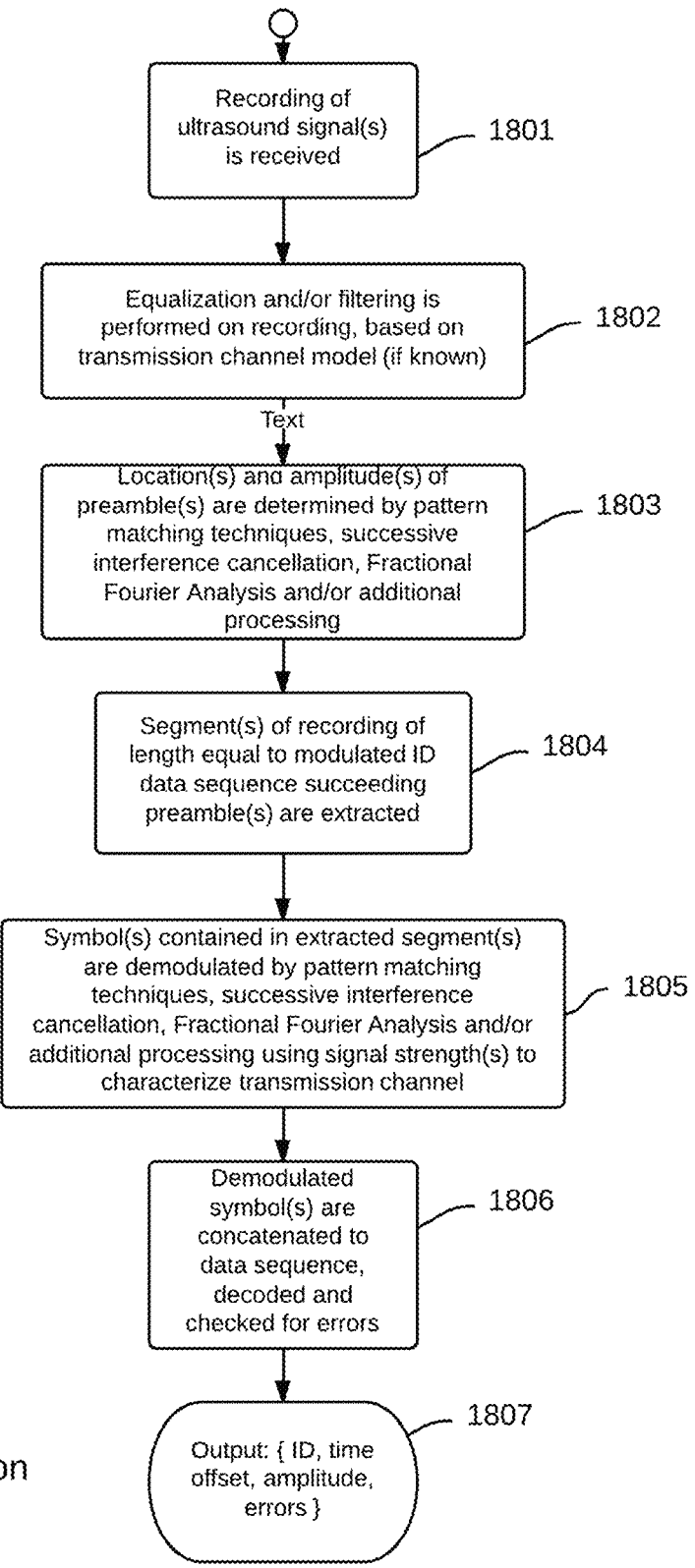
FIG 18: Demodulation and Decoding

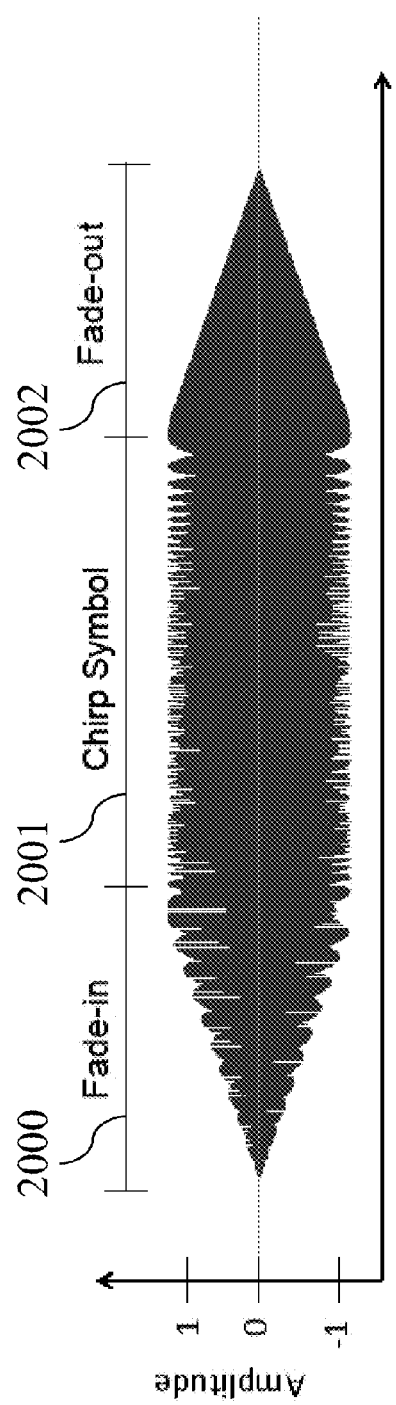
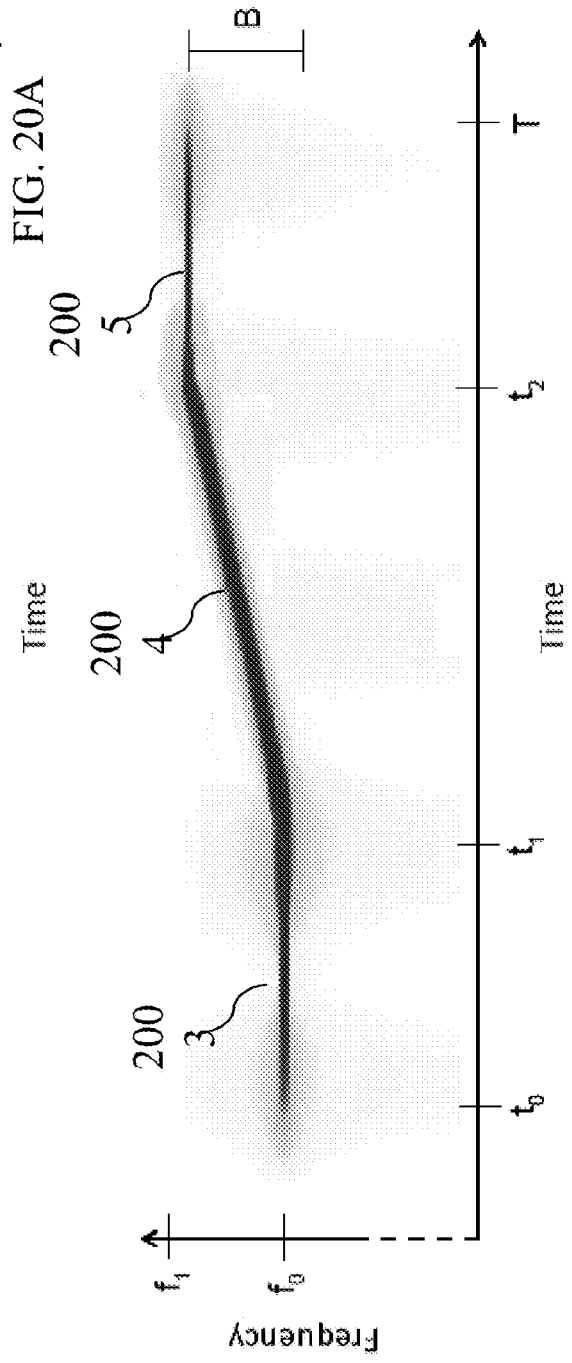
FIG. 20A
FIG. 20B

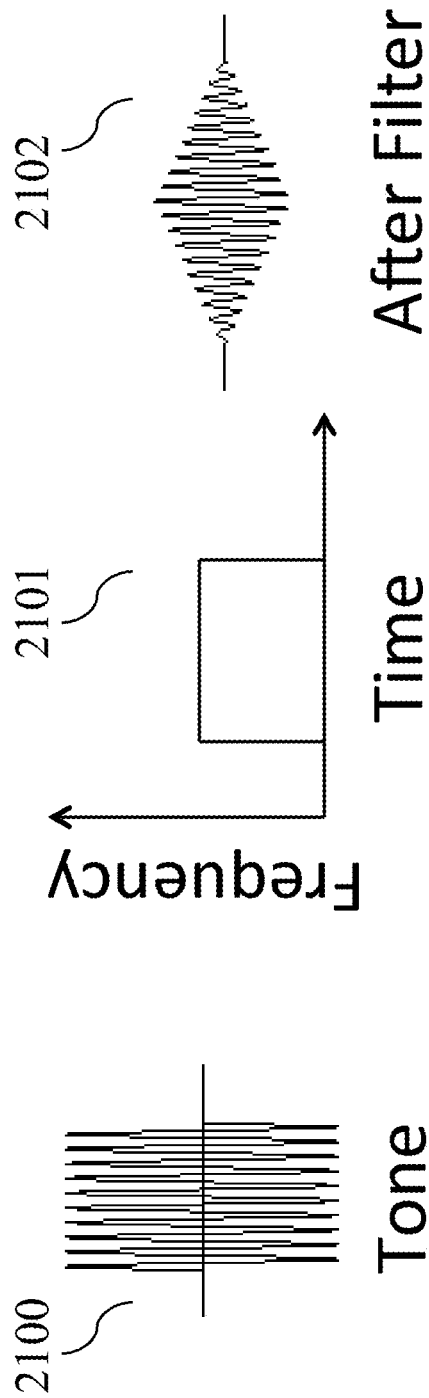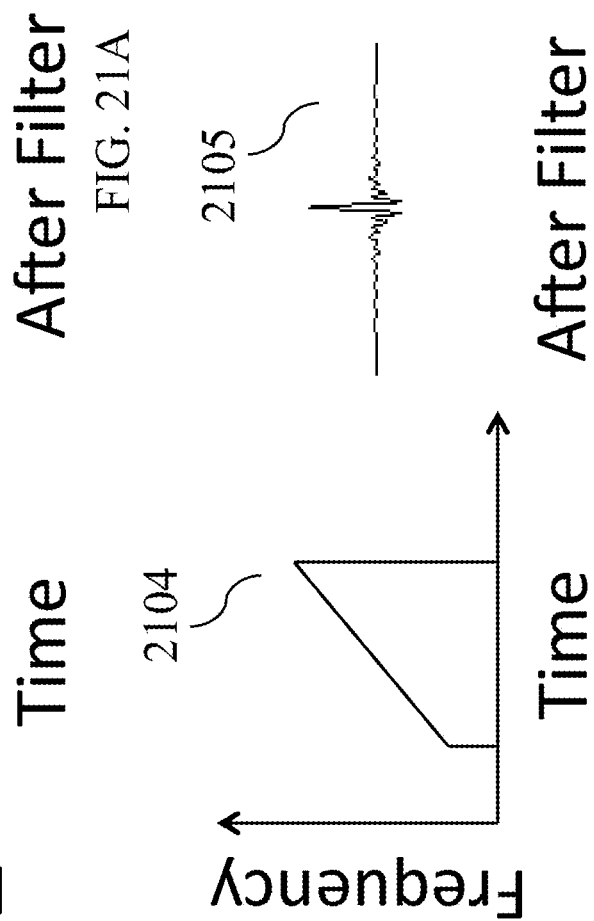

METHOD AND SYSTEM FOR ULTRASONIC SIGNALING, RANGING AND LOCATION TRACKING

CROSS-REFERENCE TO RELATED APPLICATION

This application claims priority to U.S. Provisional Application Ser. No. 61/751,080, filed Jan. 10, 2013, incorporated by reference herein in its entirety.

FIELD OF INVENTION

The present invention is a method and system for determining the two or three-dimensional position, or zone based location of one or more object devices in indoor or outdoor environment.

BACKGROUND

Location tracking systems, such as the global positioning system (GPS), have provided the ability to accurately locate mobile devices in outdoor spaces. Unfortunately, these services perform poorly indoors when GPS signals are no longer available. Highly accurate indoor location tracking would enhance a wide variety of applications including: building navigation (malls, factories, airports), augmented reality, location-aware pervasive computing, targeted advertising and social networking.

Solutions have been proposed for locating object devices indoors involving beacons and transponders. However, these systems require the installation of many densely located infrastructure devices and require complicated additional hardware in the object device. It is desirable to locate an object device indoors without the need for additional hardware attached to the device being localized.

BRIEF SUMMARY OF THE INVENTION

The method and system of this invention provides location-tracking capabilities for modern mobile devices like (but not limited to) smartphones, laptop computers and tablets without requiring additional hardware on the device. The method is intended for indoor environments, but is not limited to these. The method uses a communication primitive that operates in the ultrasound spectrum just above the human hearing frequency range, where many mobile devices are still sensitive. These communication signals can be transmitted from standard audio equipment, making it an ideal solution for indoor spaces that already have public announcement infrastructures. Transmitting data over audio speakers, even in ultrasound frequency ranges, introduces broadband human audible noises due to the non-ideal impulse response of speakers. Unlike existing audio modulation schemes, this scheme is optimized based on psychoacoustic properties so as to make it inaudible to humans. All signal components exhibit slowly changing power-levels and gradual frequency changes so as to minimize audible artifacts.

The presented method uses chirp signals that are composed of monotonically changing frequencies that benefit from Pulse Compression when being detected. Other signals capable of Pulse Compression such as Barker and Costas codes may also be employed. The scheme's modulation supports the decoding of multiple unique identifier packets being transmitted simultaneously or asynchronously. By applying a Time-Difference-of-Arrival (TDOA) pseudo-ranging and/or a Received Signal Strength Indicator (RSSI) based ranging technique, the mobile device(s) can localize themselves without additional synchronization with the broadcasting infrastructure. This design is not only scalable with respect to the number of transmitters and tracked devices, but also improves user privacy since the mobile devices compute their positions locally.

BRIEF DESCRIPTION OF THE DRAWINGS

Embodiments of the present invention will now be described, by way of example only, with reference to the accompanying drawings for the purpose of illustrating the embodiments, and not for purposes of limiting the invention, wherein:

FIGS. 2A-B illustrate example hardware architecture of a receiver and transmitter for a mobile receiver based system;

FIGS. 4A-B illustrate example software architecture of a receiver and transmitter for mobile receiver based system;

FIG. 13A-B illustrate example hardware architecture of a transmitter and receiver for a mobile transmitter based system;

FIG. 14A-B illustrate example software architecture of a transmitter and receiver for a mobile transmitter based system;

FIG. 15A-B illustrates the flow of the localization process for a mobile receiver based system;

FIG. 16A-B illustrates the flow of the localization process for a mobile transmitter based system with an asynchronous receiver;

FIG. 17 illustrates the flow of the localization process for a mobile transmitter based system with synchronous receivers;

FIG. 18 illustrates how the demodulation subsystem operates;

FIG. 20A-B shows an example of a chirp symbol with fade-in and fade-out attached; and FIG. 21A-B shows plots of a tone and a chirp signal before and after matched filtering.

DETAILED DESCRIPTION OF THE INVENTION

Figure 1:
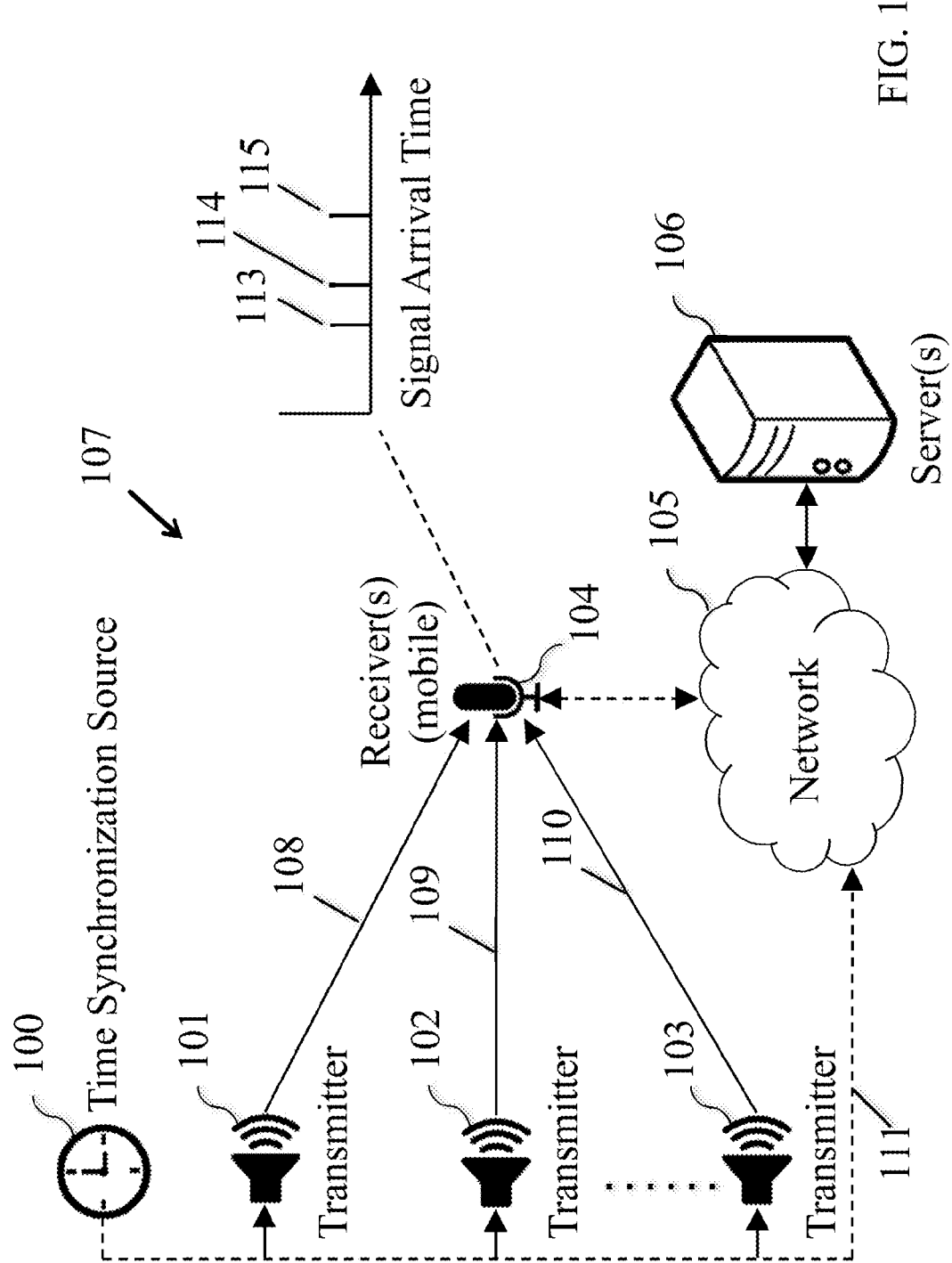
FIG. 1 shows a diagram of the main components of a mobile receiver based system.

As shown in FIG. 1, the system 107 consists of a transmission infrastructure 101-103 along with one or more mobile receiver devices 104. The transmitters 101-103 are capable of emitting ultrasound in the frequencies between 19-24 KHz or above. The receiver(s) 104 are capable of receiving the transmitted ultrasound and performing processing on it. Transmitters may be grouped and time synchronized to one or more time synchronization sources 100. Each transmitter within the same group simultaneously plays a unique ultrasound signal 108-110. These transmitted signals 108-110 are identifiable and can be decoded by the receiver(s) 104 or an external server 106, connected through a network 105. The ultrasound signals 108-110 may be broadcast periodically, triggered by a time synchronization source 100, triggered by an internal clock source 202 (FIG. 2A) and/or triggered by a different internal or external trigger. The hardware generating the ultrasound signals 108-110 may be centralized to one or more locations and/or decentralized and located by every speaker. The speakers may be part of an existing public announcement (PA) infrastructure or purposefully installed to support localization applications. The time synchronization source 100 may achieve synchronization between the speakers implicitly using wires or explicitly through a supporting mechanism like radio signals. In order to avoid requiring the mobile device(s) 104 to synchronize with the infrastructure, the system 107 uses a TDOA pseudo-ranging and a RSSI (Received Signal Strength Indicator) technique. When transmitters within a group simultaneously send their encoded identification message, each message will arrive at the receiver at a slightly different time due to the propagation delay of sound travelling different distances through the air. As illustrated in FIG. 1, each receiver is able to determine the relative timing (and ID) of each transmitted signal where signals 108-110 have arrival times corresponding to 113-115 at the receiver. The location of each transmitter is known from a mapping between each ID and its physical location, which can be determined by the system's installer/owner or determined automatically at runtime through measurement or using approaches like Simultaneous Localization and Mapping (SLAM). A database of the ID to location mapping for transmitters may be stored on the mobile receiver(s) 104, or on an external server 106, which can be accessed over the network 105. The transmitters 101-103 or a subset thereof may also transmit the ultrasound signals 108-110 asynchronously without being synchronized to the time synchronization source 100. In this case the receiver(s) 104 can determine their position based on the relative RSSI levels of the received signals 108-110 or a subset thereof.

A possible hardware architecture for a transmitter 101 is shown in FIG. 2A. A transmitter like 101 may be comprised of the following components: a processor 201, memory 204, a clock 202, amplifier 206 and a speaker 207. The transmitter may also include the following optional components: a network interface 203, a thermometer 210, a Digital to Analog Converter (DAC) 205, an Analog to Digital Converter (ADC) 208 and a microphone 209. The processor 201 is driven by the clock 202 to run the internal circuitry and to keep a local notion of time. Processor 201 has access to the memory 204, which can be used for computations and to store parts of, or the entire ultrasound signal (FIG. 1) that is transmitted. Processor 201 may be connected to network 105 (FIG. 1) by network interface 203, over which processor 201 may synchronize to the time synchronization source 100 (FIG. 1) and/or communicate with other transmitters 102, 103 or the servers 106 (FIG. 1). The DAC 205 is responsible for converting the digital representation of the ultrasound signal 108, which is to be played back, to an analog signal. DAC 205 can pass this analog signal to the amplifier 206, which may broadcast the analog signal over speaker 207. Alternately, processor 201 may also use a Pulse Code Modulation (PCM) interface to directly transfer data to the amplifier 206 for broadcasting the ultrasound signal 108. The transmitter 200 may also coordinate with other transmitters 102, 103 through the network interface 203 to determine the distances to each other. Processor 201 may determine these distances by measuring the propagation delay of an ultrasonic ranging signal sent to other transmitter(s) 102, 103. The transmitter 101 may receive the ranging signal with microphone 209, which passes the signal to ADC 208, which digitizes the signal and passes it to processor 201 for processing. The thermometer 210 may supply processor 201 with the current ambient temperature in order to calculate the speed of sound under current conditions in order to perform more accurate ranging of receiver 104.

A possible hardware architecture for a receiver 104 is shown in FIG. 2B. A receiver such as 104 may be comprised of: A processor 212, memory 215, a clock 213, an Analog to Digital Converter (ADC) 216 and a microphone 217. The receiver 104 may also include the following optional components: a network interface 214 and a thermometer 218. Processor 212 is driven by the clock 213 to run the internal circuitry and to keep an internal notion of time. The memory 215 may be used for computation. The microphone 217 can receive ultrasound transmissions, which are then digitized by the ADC 216 and passed to the processor 212. The processor 212 may then demodulate and decode the captured signals or transfer a recording of them to an external server 106 for demodulation and decoding using the network interface 214. If the server 106 performed the demodulation and decoding, the time-offsets and amplitudes of the preambles of the signals 108-110 (FIG. 1) or a subset thereof may be transferred back to the receiver 104 over the network 105 (FIG. 1) from the server(s) 106. If the receiver 104 is to calculate its own position, it requires a mapping between the locations of the transmitters 101-103 (FIG. 1) and their IDs, which can either be stored a priori in the memory 215, or received through the network interface 214. The receiver 104 may then determine it's own location based on the locations of the transmitters 101-103, the time-offsets and/or the locations of the preambles in the signals 108-110 using the processor 212. The calculated location can be made available to other devices over the network interface 214. The thermometer 218 may be used to measure the current ambient temperature in order to calculate the speed of sound under current conditions in order to perform more accurate ranging.

Figure 3A:
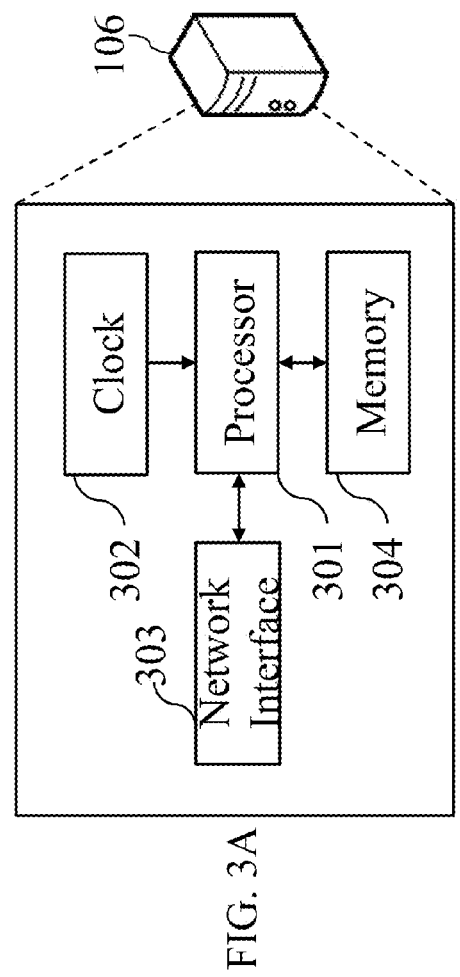
FIGS. 3A-B illustrate example hardware architecture of a server and time synchronization source for both a mobile receiver and mobile transmitter based system.
Figure 3B:
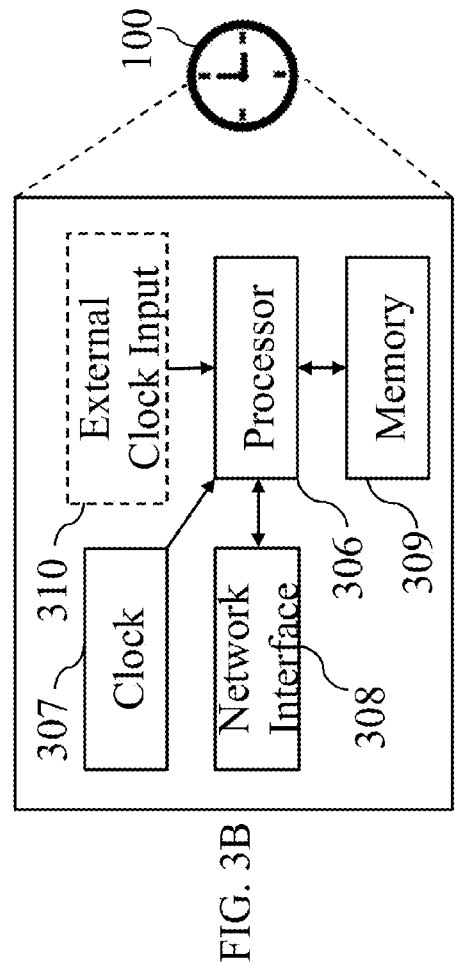

A possible hardware architecture for a server 300 is shown in FIG. 3. A server may be comprised of: A processor 301, memory 304, a network interface 303, and a clock 302. The processor 301 is driven by the clock 302 to run the internal circuitry and to keep an internal notion of time. The memory 304 may be used for computation and to store a database, mapping transmitter IDs to their respective transmitter locations. The server may receive transmissions from the receivers 104 containing recordings of ultrasonic transmissions or sets of TDOA data. It may then process this information to determine the position of the receiver that sent the transmission. It may also receive transmissions from the transmitters 101-103, containing ultrasonic transmissions used for determining the location of the transmitters, or already processed location information. The server may then process this information and add it to its database.

A possible hardware architecture for a time synchronization source 100 is shown in FIG. 3. A time synchronization source may be comprised of: A processor 306, memory 309, a network interface 308, a clock 307. A time synchronization source 100 may also have an external clock input 310. The processor 306 is driven by the clock 307 to run the internal circuitry and to keep an internal notion of time. The memory 304 may be used for computation. The processor 306 may keep a notion of time according to the clock 307, the network interface 308 or according to the external clock input 310, which may be driven by hardware supplying a clock signal such a GPS receiver. The processor 306 may communicate with the transmitters 101-103 (FIG. 1) over the network interface 308 in order to synchronize them in time.

A possible software architecture for a transmitter 101 is shown in FIG. 4A. A transmitter may be comprised of a ranging and/or control algorithm 401, a player 404, a digital representation of the transmitter's ID 407 and a digital representation of the modulated ultrasound data symbols used to encode the transmitter's ID or a method for modulating them 408. The transmitter 101 may also include the following optional components: a network stack 402, a modulator 403, a recorder 405, a demodulator 406 and a digital representation of the current ambient temperature 409. The ranging and/or control algorithm 401 may be used to receive the transmitter's ID over a network connection using the network stack 402, or may be read from memory. The ranging and/or control algorithm 401 may then encode the transmitter's ID 407 as an ultrasound waveform using the modulator 403. Once the waveform is synthesized or a pre-synthesized waveform is read from memory, it may be transmitted using the player 404. This transmission can be triggered by an internal or external synchronization signal, which may be received by the network stack 402 and then passed to the ranging and control algorithm 401. The transmitter may also support ranging to other transmitters 102-103 (FIG. 1) by performing time of flight ranging using the ranging and/or control algorithm 401, the network stack 402 for time synchronizing with other transmitters, the player 404 and optionally the modulator 403 for transmitting an ultrasound ranging signal to other transmitters and the recorder 405 and demodulator 406 for receiving ultrasound ranging signals from other transmitters. The temperature value 409 may be used to calculate the speed of sound under current conditions in order to perform more accurate ranging between transmitters, or may be transmitted to other parts of the system to perform more accurate ranging there.

A possible software architecture for a receiver 104 is shown in FIG. 4B. A transmitter may be comprised of a localization and/or control algorithm 411 and a recorder 413. A receiver 104 may also contain the following optional components: a network stack 412, a demodulator 414, a digital representation of the modulated ultrasound data symbols 415 used by transmitters 101-103 (FIG. 1) to encode their IDs, a local location database 416 and a location service output 417. The localization and/or control algorithm 411 can use the recorder 413 to receive ultrasound transmissions from a subset or all transmitters 101-103. The demodulator 414 may be used to demodulate the recorded transmissions. The demodulator 414 can use the symbols 415 as templates in pattern matching and processing techniques mentioned herein to demodulate the ultrasound transmissions. The localization and/or control algorithm 411 may also outsource demodulation of captured ultrasound signals to servers 106 (FIG. 1) by transmitting them over the network stack 412. The local location database 416 can store a mapping between the locations of a subset or all transmitters 101-103 and their respective IDs and may be populated by the localization and/or control algorithm 411 receiving this data over the network stack 412. The calculation of the position of the receiver 410 may also be performed by the localization and/or control algorithm 411, or it may be outsourced to server 106 by transmitting the demodulated IDs with the time-offsets of their respective preambles and their amplitudes over the network stack 412. The location service 417 may provide an interface to applications for obtaining the current location of the receiver 410, which is provided by the localization and/or control algorithm 411. If location processing is outsourced, the localization and/or control algorithm 411 may need to receive the calculated position of the receiver 104 from servers 106 through the network stack 412.

Figure 5A:
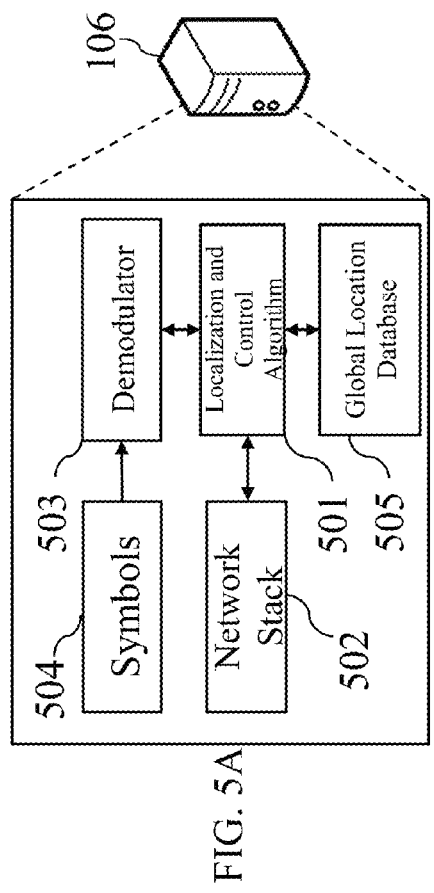
FIGS. 5A-B illustrate example software architecture of a server and time synchronization source for a mobile receiver and mobile transmitter based system.

A possible software architecture for a server 106 is shown in FIG. 5A. A server 106 may be comprised of a localization and/or control algorithm 501 and a network stack 502. A server 106 may also include the following components: a demodulator 503, a digital representation of the modulated ultrasound data symbols 504 used by transmitters 400 to encode their IDs and a global location database 505. The localization and/or control algorithm may receive recordings of ultrasound transmissions containing encoded transmitter IDs over the network stack 502. The algorithm may then send them to the demodulator 503 to demodulate the contained symbols. The demodulator can use the symbols 504 as templates in pattern matching and processing techniques mentioned herein to demodulate the ultrasound transmissions. The localization and/or control algorithm 501 may then decode the received IDs, measure the time offsets and/or amplitudes of their corresponding preambles and look up the locations of the corresponding transmitters 101-103 (FIG. 1) from the global location database 505. The algorithm can now calculate the location of the receiver 104, which received the transmissions and may transmit the results back to the receiver 104 over the network stack 502. The server may also outsource the calculation of the position to another server similar to 106 by sending it the demodulated IDs, time offsets and/or amplitudes of the corresponding preambles and the locations of the corresponding transmitters. The server may fill and/or update its global location database 505 with the positions and corresponding IDs of transmitters 101-103 by receiving this data from other devices in the system over the network stack 502.

Figure 5B:
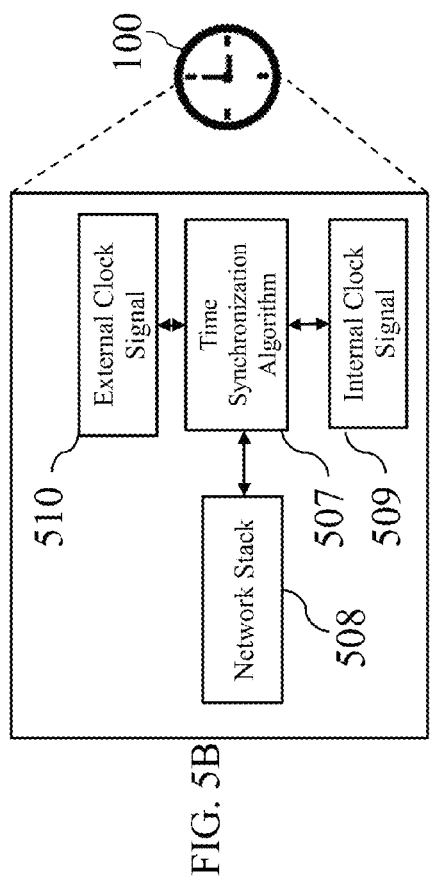

A possible software architecture for a time synchronization source 100 is shown in FIG. 5B. A time synchronization source may be comprised of a time synchronization algorithm 507, a network stack 508, and receive inputs from an internal clock signal 509 or optionally from an external clock signal 510. The time synchronization algorithm 510 synchronizes the time synchronization source 506 with either its internal clock signal 509 or an external clock signal 510. The time synchronization source 506 can then periodically send out messages over the network stack 508 to other devices in the system in order to synchronize them to its clock.

The present method allows demodulation of signals from multiple concurrent transmitters in order to simplify the tiling process of placing speakers across an indoor space with many overlapping domains (airports, malls, etc). A common technique in radio engineering for sending data is to use channel-spreading techniques like Direct Sequence Spread Spectrum (DSSS). Unfortunately, most of these spreading techniques require rapid on-off transmission intervals as well as large frequency jumps that would generate audible artifacts when transmitted from speakers. The present method uses one or more of a variety of ultrasonic symbols such as those shown in FIG. 6-9 in order to perform Chirp Spread Spectrum (CSS) data and range transmissions. This method could also be used to detect the presence of a transmitter without time difference of arrival information for applications requiring lower accuracy.

Figure 6:
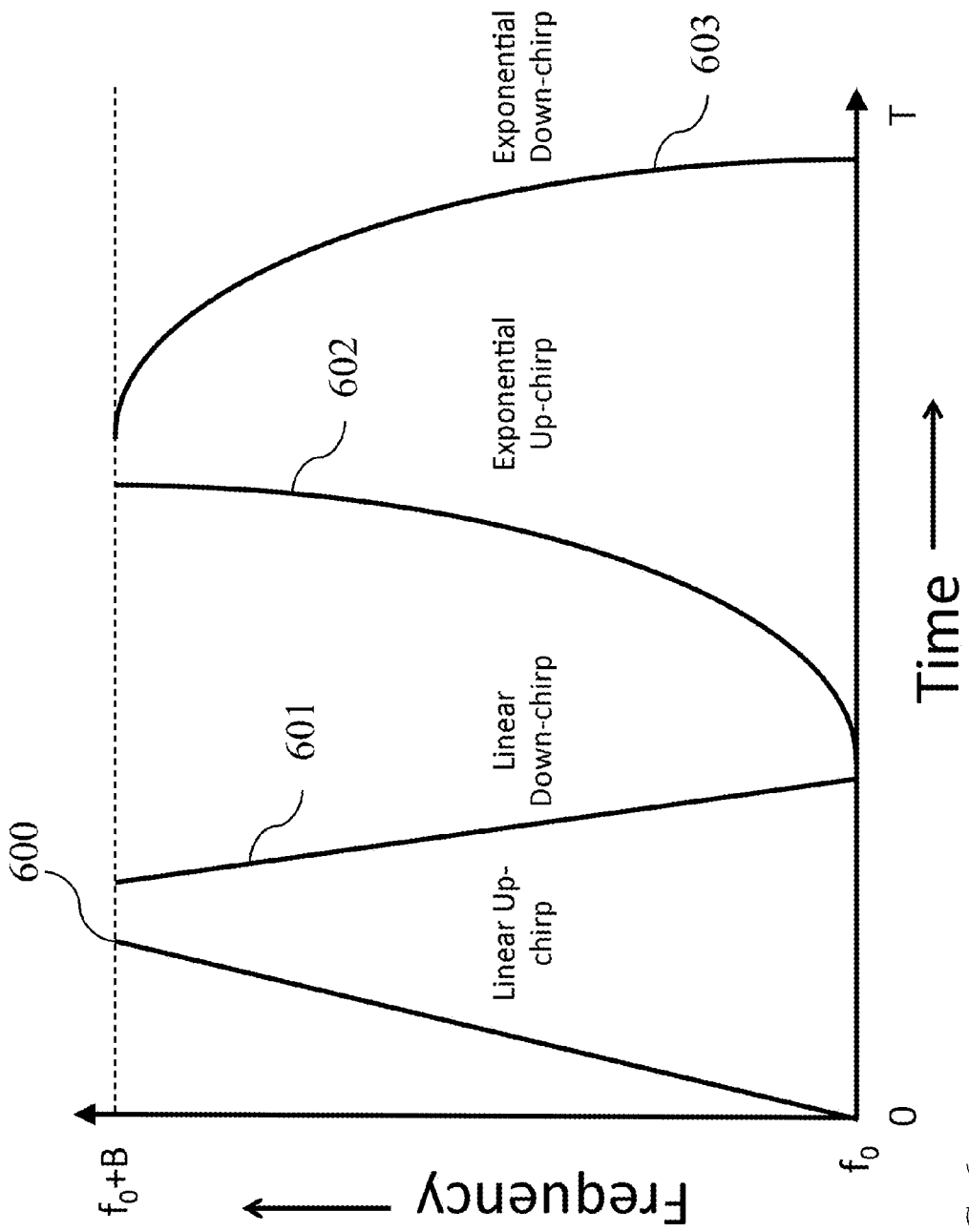
FIG. 6 shows examples of linear and exponential chirp symbols.

Each individual symbol in the present method is composed of a waveform that is monotonically increasing (up-chirp) (FIG. 6 600, 602) or decreasing (down-chirp) (FIG. 6 601,603) in frequency as a function of time, known as a chirp. Furthermore different symbols may occupy different ranges of the ultrasound spectrum, have different time durations and be of varying amplitudes. The present method can use one or a combination of the following symbol designs:

(1) Up- and down-chirps with a linear relationship between frequency and time as shown in 600 and 601 respectively in FIG. 6

(2) Up- and down-chirps with an exponential relationship between frequency and time as shown in 602 and 603 respectively in FIG. 6

(3) Up- and down-chirps with an otherwise monotonically changing relationship between frequency and time.

Figure 7:
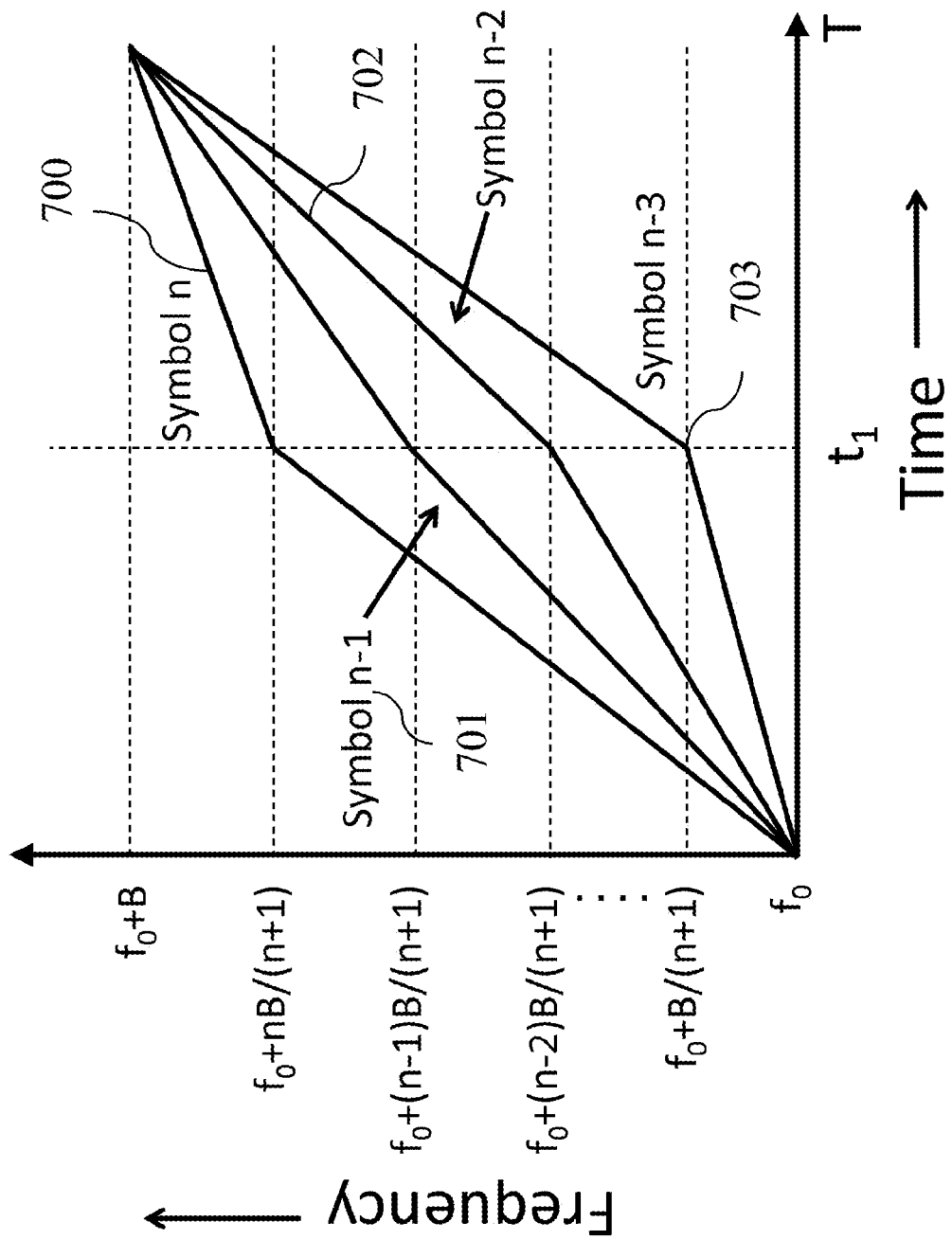
FIG. 7 shows rate adaptive chirp data symbols.

(4) Up- and down-chirps as described in (1), (2) or (3), which employ multiple different rates of change for the relationship between frequency and time (see FIG. 7). As described below, one or more rates can be used to define a set of symbols.

(5) Chirps described in (1), (2), (3) or (4), to which a window function has been applied.

(6) Chirps described in (1), (2), (3), (4) or (5), to which an equalization function has been applied.

(7) Other symbols which benefit from Pulse Compression (as described herein) such as Barker and Costas Codes well known in the art.

Detection of a chirp waveform benefits from a signal processing technique known as Pulse Compression. Pulse Compression is commonly used in RADAR systems to increase range resolution as well as receiver sensitivity. When the received chirp is passed through a matched filter with the original waveform that was transmitted, the width of the output signals is smaller than what you would see when using a standard sinusoidal pulse as a ranging signal as can be seen in FIG. 21A-B 2100-2105. Alternately a Fractional Fourier Transform can be applied to the received signal to obtain similar benefits. This compression makes the signal simpler to detect as it effectively increases its SNR, which leads to lower amounts of timing jitter, hence improving the range resolution. Other waveforms such as Barker and Costas Codes also benefit from Pulse Compression and may also be employed solely or in a combination with chirps.

The demodulation of the received signal as shown in FIG. 17 is performed completely in software, in part by a pattern matching process known as matched filtering 1703, 1705 (it could also be achieved using cross-correlation) and/or Fractional Fourier Analysis. In matched filtering, an incoming signal is convolved with a conjugated time-reversed version of a signature signal that is expected to be contained within the received signal. This results in a distribution showing the similarity of both signals as they are slid across each other. Peaks of high magnitude denote a high correlation between both signals, therefore making it likely that an instance of the signature signal is located at the same location as the peak in the received signal. Therefore, by applying a matched filter for each rate adjusted chirp and the preamble, a receiver is able to determine the starting locations of the signals as well as the time difference between them.

The present method may use Fractional Fourier Analysis to better demodulate the individual symbols contained within the received signal. The Fractional Fourier Transform (FrFT), is a mathematical technique to transform a given function in the time or frequency domain, to a domain between time and frequency. This fractional domain is specified by an angle of rotation between the time and the frequency domain. The FrFT allows the disaggregation of chirp symbols that were received in close temporal proximity, or even at the same time, by spreading them apart in the fractional domain. The receiver can more easily identify and demodulate individual symbols from this transformation.

Chirp symbols that are received in close temporal proximity or at the same time, need to be separable in order to not corrupt the received data. To achieve this, one or many of the following techniques are employed by the present method:

(1) The rate of frequency change within each chirp can be used to help separate different symbol signals. A common approach is to decompose each chirp into two interconnected chirps with different frequency rates that change at a point in time $t_1$ of the symbol of duration T, where $t_1 < T$. FIG. 7 illustrates a scheme that supports n unique symbols 700-703 across a shared bandwidth B, with a lower frequency bound of $f_0$. Each rate represents a different signal waveform that is passed through a matched filter with the received signal to extract the embedded sequences of data. Rate adjusted chirps are relatively orthogonal as long as the rate set is kept to a reasonable number. Our proposed method can utilize one or more rates to compose unique symbols. The multi-rate symbol is generated such that the overall signal maintains a continuous sinusoid.

Figure 8:
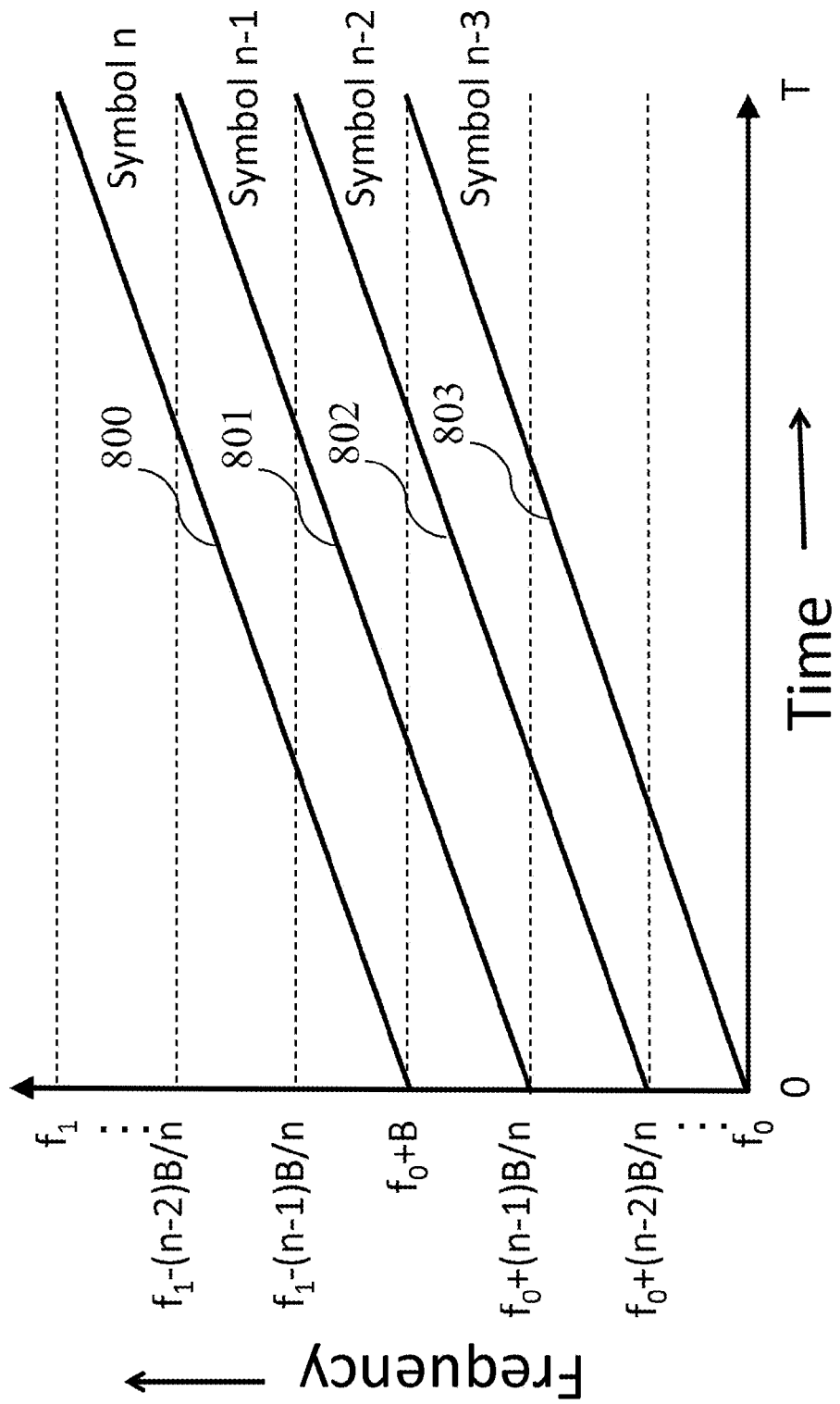
FIG. 8 shows chirp symbols of different initial frequencies.

(2) Chirps of varying initial frequencies (e.g. 20.1-21.1 kHz, 20.2-21.2 kHz, etc.) as shown in FIG. 8 can be disaggregated using Fractional Fourier Analysis. FIG. 8 illustrates n symbols 800-803, each occupying a bandwidth B and a length in time T. $f_0$ denotes the lowest frequency in the set of symbols and $f_1$ denotes the highest. When the received signal is rotated between the time and frequency domain at a certain angle, chirps of varying initial frequencies are spread across the fractional domain and can be more easily demodulated.

Figure 9:
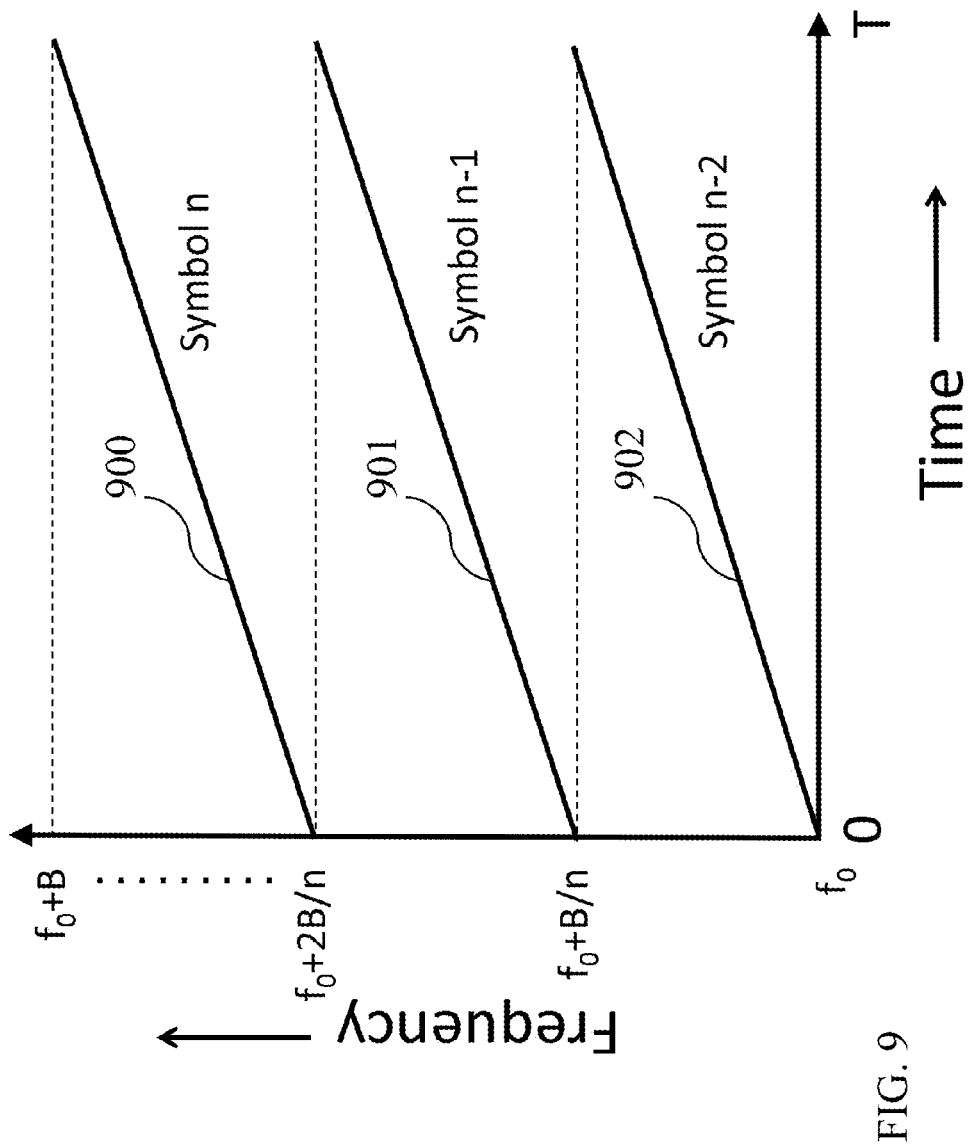
FIG. 9 shows chirp symbols separated into different frequency bands.

(3) Chirps can be spread over unique frequency spectra (e.g. 20-21 kHz, 21-22 kHz, etc.). Commonly known as Frequency Division Multiple Access (FDMA) shown in FIG. 9, chirps occupying different, usually non-overlapping frequency spectra within a bandwidth B are orthogonal to each other and can be disaggregated using matched filtering. FIG. 9 shows n symbols 900-902 of length T, each occupying a portion of the spectrum of bandwidth B with a lowest initial frequency $f_0$.

(4) Chirps symbols can be coded using orthogonal codes. Commonly known as Code Division Multiple Access (CDMA), orthogonal symbols and/or codes (e.g. Pseudo-Random Codes, Gold codes, etc.) allow the disaggregation of multiple symbols. Up-down-chirps and (2) are variants of CDMA.

The present method also prefixes each data packet with clearly identifiable preambles represented by one or more of the symbols detailed in FIGS. 6-9, which are highly orthogonal with respect to the relatively short chirp symbols. The preambles, shown in FIG. 10 (1001, 1007), mark the beginning of the data packets 1000, 1003, which allows the region of the signal used for demodulation to be bound and it can act as preamble for receivers to synchronize to a transmitter's broadcasts. A spectrogram showing a sample signal 1900 as received by a receiver can be seen in FIG. 19. Since each transmitter broadcasts identical sequences of data periodically, the ID of incoming data sequences can be predicted based on their arrival time with respect to a previous sequence. Therefore once a receiver is synchronized to a particular transmitter, TDOA ranging can be performed on each detected symbol, before the entire corresponding data sequence is decoded.

This optimization allows for significantly higher ranging update rates (but is not required). The preambles also provide us with an estimate of the amplitude of the following data sequence, which can be used to characterize the transmission channel in order to apply dynamic equalization and/or to determine the RSSI of the packet. The delay between the data symbols and the preamble can be used to filter overlapping symbols according to their magnitude and position in time.

Figure 10:
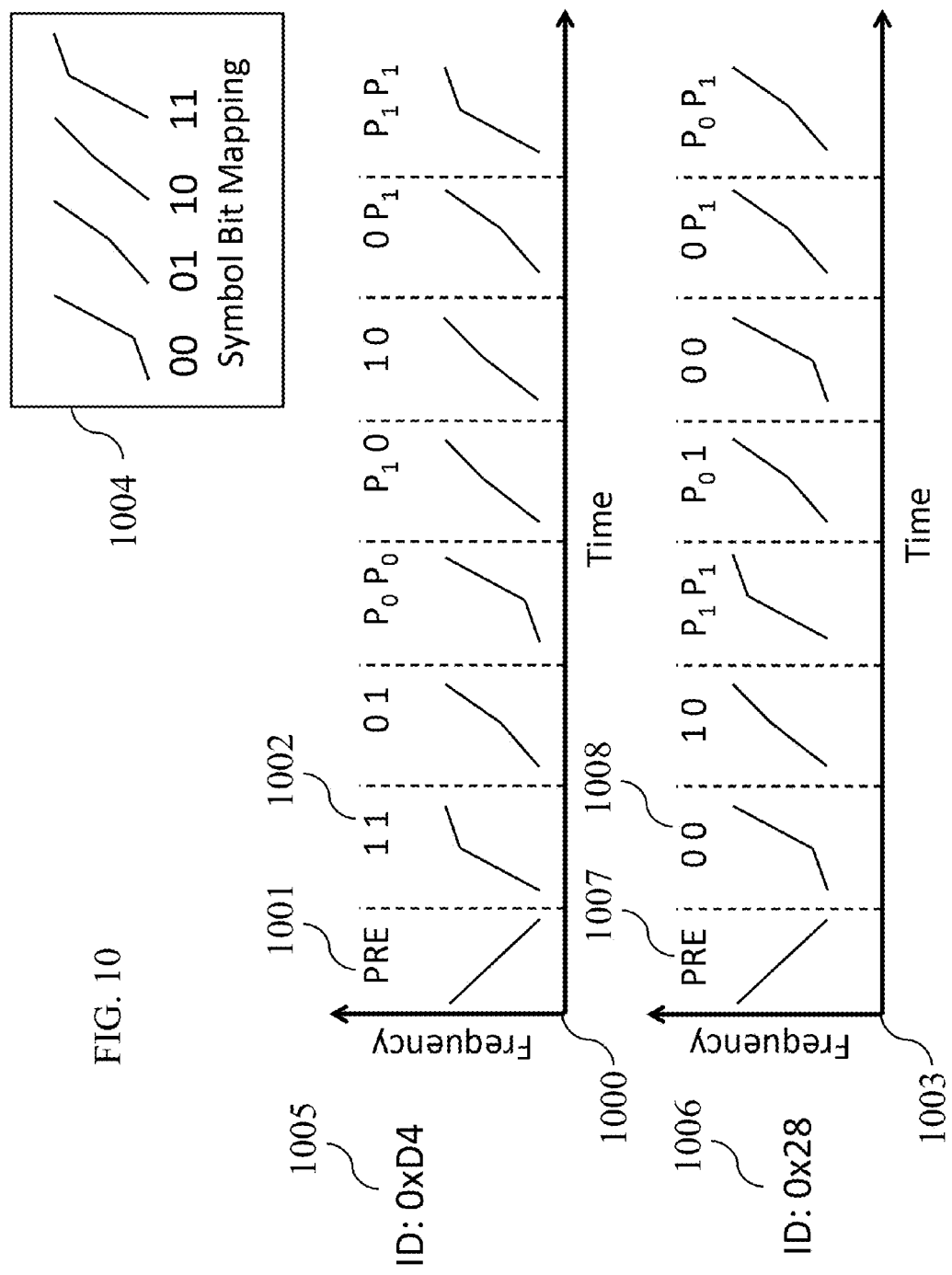
FIG. 10 shows two example packets with Hamming codes using rate adjust chirp symbols.

FIG. 10. shows an ID (1005 and 1006) encoded as a series of up-chirps (beginning with 1002, 1008), each representing two bits. In this example, the two transmitters are using a four-symbol chirp modulation scheme (1004) based on chirp rate adaptation as described herein. Each transmitter ID is encoded as a sequence of two (7, 4) Hamming codes, allowing the transmission of 256 unique IDs by using seven two-bit symbols. The error coding allows for the correction of up to two single-bit errors and detects all single-bit, as well as two-bit errors. Furthermore, as a mobile device moves through a space, a map can be used to identify which transmitters are likely to be in range, allowing out-of-range IDs that were erroneously decoded to be discarded. Each data symbol is represented as a rate adapted up-chirp, and is prefixed by a preamble (1001, 1007) encoded as a constant-rate down-chip. The preambles (1001) are used to mark the beginnings of data sequences 1000, 1003 and to measure high resolution TDOA information from. The modulation scheme can be easily adapted to larger installations with more than 256 transmitters by extending the Hamming codes and/or tiling the transmitters. For example a (15, 11) Hamming code would support 2048 transmitters. Other error correcting codes such as Golay, Reed-Solomon, etc. may also be used.

While the system may use system-wide unique IDs to identify transmitters, it may also reuse IDs and employ additional information to determine the transmitter sending the ultrasound signal. There are various ways known in the art to do this, such as tiling transmitters so that the combination of IDs received from a group of transmitters that are in range of each other is unique. At least one of the IDs in the group of transmitters may now be reused at a different location of the system, which is out of range, as long as it is grouped with IDs that are different to those remaining from the former group. Additionally, other information such as that provided by other location services (WiFi based, GPS, etc.) or external sensors such as air pressure may provide a coarse grained location estimate, allowing the differentiation of IDs reused in other parts of the target environment.

Figure 11:
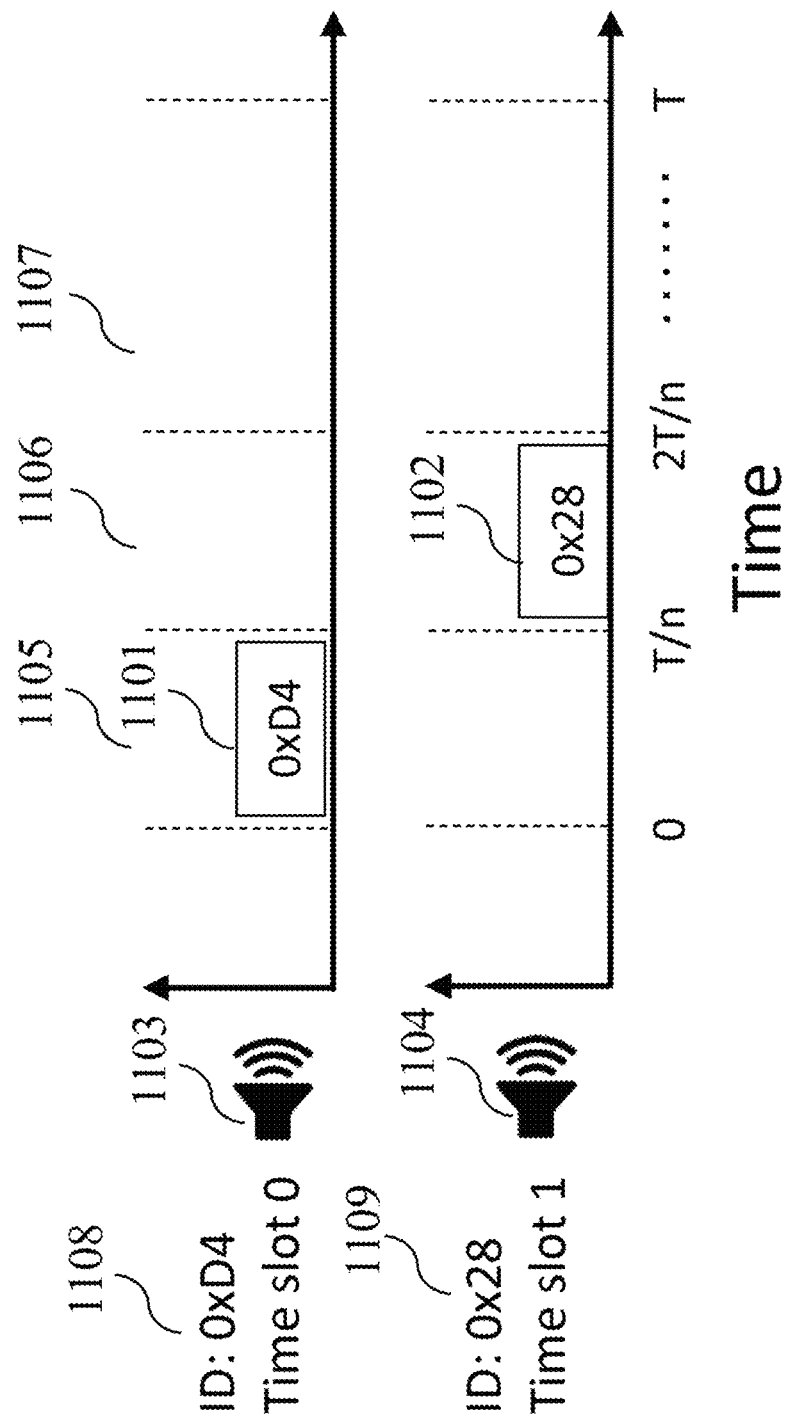
FIG. 11 shows data packets transmitted using time division multiple access scheme (TDMA)

There are multiple ways to facilitate multiple-access data transmissions, including Time Division Multiple Access (TDMA), Frequency Division Multiple Access (FDMA) and Code-Division Multiple Access (CDMA). TDMA can be used to schedule data transmissions in a collision-free manner by spacing them out in time. FDMA can be used to multiplex transmitters using different frequencies at the cost of ranging resolution. CDMA multiplexes data transmissions as orthogonal codes. The present method can be tuned for a particular application using variations of all three techniques. For example FIG. 11 shows two packet transmissions 1101, 1102 from transmitters 1103, 1104, spaced out in time using TDMA. The packet ID 0xD4 (1108) is transmitted in the first time slot 1101 of the TDMA frame at time 0, where n is the number of slots in the TDMA frame and T is the time duration of the TDMA frame. The packet with ID 0x28 (1109) is transmitted in the next time slot 1106 at time T/n. TDMA can also allow the reuse of IDs within a TDMA frame. Transmitters can then be uniquely identified by the time slot in which a transmission is received or a combination of the time slot and ID that was transmitted.

To perform TDOA pseudo-ranging, the system needs to measure the time difference of arrival of several ultrasonic signals, broadcast simultaneously (usually from stationary nodes) and arriving at a common location (usually a mobile node) or a single ultrasonic signal arriving at different locations (usually stationary nodes), which can record them in a time-synchronized manner. The location of the mobile node of the system can be determined by multilateration, which is well known in the art. Multilateration utilizes the time differences of arrival of the signal(s) as well as the locations of the stationary nodes to calculate the position of the mobile node.

Alternately to the TDOA localization technique employed in the current method, a Received Signal Strength Indicator (RSSI) based method can be used. In this mode of operation, the IDs from all received ultrasound signals from the transmission infrastructure are mapped to their known locations and their associated received signal strength is used to determine the receiver's location. This method decreases the location accuracy, however, benefits from requiring a sparser transmitter infrastructure (for example a single transmitter per room may be sufficient to obtain room-level localization accuracy) and allows the transmitters to transmit their ultrasound transmissions asynchronously.

The present method benefits from multiple techniques that can be used to improve detection accuracy. For example, Successive Interference Cancellation (SCS) is a common technique where modulated signals of successfully decoded data sequences are reconstructed and then subtracted from the received signal in order of descending amplitude before any further decoding is performed. The present method may employ the Fractional Fourier Analysis technique described herein to perform SCS. The incorporation of a Rake Receiver and/or an Adaptive Matched Filter, both well known in the art, may be used to improve robustness against multi-path interference. Furthermore, graphic or parametric equalization may be employed at the receiver and/or transmitter to compensate for the non-linear frequency response of the transmission and/or receiver hardware in order to improve signal demodulation. Equalization may be performed in a static manner at the transmitter to equalize the frequency response of the transmitter's speaker, and in a static and dynamic manner at the receiver to equalize the static frequency response of the receiver's microphone and the dynamic transfer function of the transmission channel.

One of the main challenges associated with near-sonic modulation over electroacoustic transducers such as audio speakers is avoiding humanly perceivable artifacts. Since speakers are mechanical systems, they cannot rapidly transition between power levels without creating audible artifacts such as clicking noises. To alleviate these problems, the present method uses chirp signals with slow amplitude fade-in and fade-out changes, slow frequency changes with adjustments that are only made during zero-crossing points in the signal. FIG. 19A shows the overall layout associated with our inaudible chirp symbols. FIG. 19A illustrates this layout using the linear chirp symbol 600 from FIG. 6, shown here in the time domain as 1901 and in the frequency domain as 1904, but other symbols described herein may also be employed. The chirp 1901/1904 is prefixed by a sinusoid 1900/1903 between times $t_0$ and $t_1$, which is gradually increasing in amplitude 0-1 and exhibits a frequency equal to the initial frequency $f_0$ of the chirp 1901/1904. The chirp 1901/1904 spans the time $t_1$ to $t_2$, is of constant amplitude 1 and spans a frequency range $f_0$ to $f_1$ equal to a bandwidth B. The sinusoid 1902/1905 of a frequency equal to the final frequency $f_1$ and a decreasing amplitude from 1-0 and a duration between $t_2$ and T is appended to the chirp 1901/1904. Certain windowing functions applied to the chirp 1901/1904 may provide sufficient attenuation at the start and end of the signal to allow the omission of the sinusoids 1900/1903 and 1902/1905.

The chirp waveform that is used for matched filtering does not include the fade-in and fade-out periods 1900/1903 and 1902/1905 (FIG. 19A-B) respectively, since this would interfere with the Pulse Compression performance of the filter. One of the main contributions of this method is the ability to transmit data and ranging information over standard speakers without introducing audible artifacts.

FIG. 15-A illustrates the method run in full or in part by each transmitter 101-103 (FIG. 1) of system 107 to localize the mobile receiver(s) 104. The following steps may be performed by each transmitter 101-103 or by the server 106. Initially, as shown in 1501, each transmitter 101-103 may be either manually or automatically assigned an ID, which can then be loaded from local memory. The ID is then converted into an encoded data sequence 1502 by applying a Hamming, Golay, Reed Solomon or other error correcting code to form a data packet as shown in 1000 and 1003 (FIG. 10). Further encoding to compress the data sequence and/or add additional information is also possible. Next an ultrasonic waveform containing the created data sequence may be generated 1503. This can be done by modulating the data sequence into a waveform as described herein, or by concatenating already modulated symbols as shown in FIG. 6-9. If the waveform is generated externally to the transmitter(s) 101-103, it may be transmitted to them over the network 105 and stored in their local memory. The following steps may be performed by each transmitter 101-103: If a transmitter 101-103 is not to support TDOA ranging 1504, it may load its ultrasound waveform from memory and transmit it periodically, according to an internal or external trigger 1505-1506. If a transmitter 101-103 is to support TDOA ranging, it may synchronize to and external time synchronization source 100 (FIG. 1) as described in 1507. Once synchronized, it may now transmit its ultrasound waveform (1508) when triggered by the time synchronization source 100. Each transmitter 101-103 supporting TDOA ranging can attempt to maintain synchronization with the time synchronization source 100, and resynchronizes if synchronization is lost (1509). While each transmitter 101-103 supporting TDOA ranging is synchronized, it transmits its ultrasound waveform according to the triggers given by the time synchronization source 100.

FIG. 15-B illustrates the method run in full or in part by each receiver 104 (FIG. 1) of system 107 to be localized. The following two paragraphs, as well as FIG. 15B, describe the method as may be run on a single receiver, however, a plurality of receivers may execute multiple instances of the method simultaneously. Initially (1510) the receiver 104 may record any ultrasound signal(s) 108-110 (FIG. 1) transmitted from the transmitter(s) 101-103 (FIG. 1) that are within range at a constant rate. If the receiver 104 is configured to demodulate and decode the received ultrasound signal(s) (1511), contained in the recording it created, it may proceed to do so as detailed in FIG. 18 (1513) to extract any transmitter ID(s), and the signal strength(s) and time offset(s) corresponding to the preamble(s) of the modulated transmitter ID(s). If non-recoverable errors were encountered in 1513, the receiver 104 can discard the recording of the ultrasound signal(s) and any demodulation/decoding results and can return to 1510. If one or more decoded ID(s) pass the error check (1514), the transmitter can continue on to 1515. If the receiver is not configured to calculate its own position from the decoded data, it may now transfer the decoded ID(s), signal strength(s) and time-offset(s) of the preamble(s) to server 106 (FIG. 1) over the network 105 (FIG. 1) as described in 1516. If the receiver 104 is configured to calculate its own position and outsourced demodulation and decoding of the received signals 108-110 to server(s) 106 at 1512, it may receive the decoded ID(s), signal strength(s) and time-offset(s) of the preamble(s) from the server 106 over the network 105 before proceeding to 1521. Next the receiver 104 can load a mapping between the decoded ID(s) and the location(s) of the transmitter(s) 101-103. This mapping may be fetched from local memory (if present) (1521), or from server 106 over the network 105 as described in 1522. If sufficient IDs have been decoded to perform TDOA ranging (1523) to the degree of accuracy and amount of dimensions requested, the receiver 104 can now calculate its location using the method described herein (1527). Otherwise, a zone-based location may be calculated as described herein. The outputs 1526 of this method are the location of the receiver 104 in form of coordinates or another identifier, which can be mapped to a location as well as any errors that were encountered while executing the method.

If the receiver 104 transferred the recording of the signal(s) 108-110 (FIG. 1) to the server 106 (FIG. 1) as described in 1512, the server 106 can then proceed to demodulate and decode the transferred recording (1515) as detailed in FIG. 18. If non-recoverable errors were encountered in 1518, the server 104 can discard the recording of the signal and any demodulation/decoding results and the receiver 104 can return to 1510. If one more decoded ID(s) pass the error check (1514), the server continues on to 1519. If the server is not configured to calculate the position of the receiver from the decoded data, it can now transfer the decoded ID(s), signal strength(s) and time-offset(s) of the preamble(s) back to the receiver 104 (FIG. 1) over the network 105 (FIG. 1) as described in 1520. Otherwise, the server 106 needs to load a mapping between the decoded ID(s) and the location(s) of the transmitter(s) 101-103. This mapping can be fetched from local memory (if present) (1523), or from other server(s) 106 over the network 105 as described in 1524. If sufficient IDs have been decoded to perform TDOA ranging (1521) to the degree of accuracy and amount of dimensions requested, the server 106 can now calculate the location of the receiver 104 using the method described herein (1524). Otherwise, a zone-based location may be calculated as described herein (1525).

The method for demodulating and decoding received ultrasound transmission(s) like 108-110 (FIG. 1) is shown in FIG. 18, which is a detailed illustration of the blocks 1513 and 1517 in FIG. 15B, blocks 1610 and 1615 in FIG. 16B, and blocks 1706 and 1711 in FIG. 17. This method may be run on a receiver such as 104 (FIG. 1) or an external processor like server 106 (FIG. 1). Initially, a recording of one or more ultrasonic signal(s) 108-110 is received by the device performing the demodulation and decoding (1801). The recording may be pre-processed by applying equalization and/or additional filtering as described herein (1802) to aid demodulation. Next the location(s) in time (time-offset(s)) and amplitudes of the preamble(s) can be determined by pattern matching techniques such as matched filtering, possibly in combination with Successive Interference Cancellation (SCS), Fractional Fourier Analysis and/or additional processing (1803). Once the preamble(s) are found, the segments of the signal containing the data sequences, which are appended to them, can be extracted since their length in time is known (1804). For each extracted segment, the symbol(s) contained therein can now be demodulated by pattern matching techniques such as matched filtering, possibly in combination with SCS, Fractional Fourier Analysis and/or additional processing (1805). To aid the process 1805 and 1803, the signal strength(s) as a function of time of the preamble(s) and/or symbol(s) contained within the recording may be used to characterize the transmission channel, through which the signal(s) 108-110 were transmitted. This information may be used to bias the employed filter(s) in order to aid demodulation. Once the symbol(s) are demodulated, they can be concatenated to form the corresponding transmitted data sequence and can then be decoded. The decoded sequence can then be checked for errors by applying a Hamming, Golay, Reed Solomon or other error correcting code (depending upon the type of error correction that was used in the transmitted signal) (1806). The method can finally output the decoded ID of each received ultrasonic signal 108-110, the amplitude and time offset of the preambles associated with each ID and any errors that were encountered during the process (1807).

Figure 19:
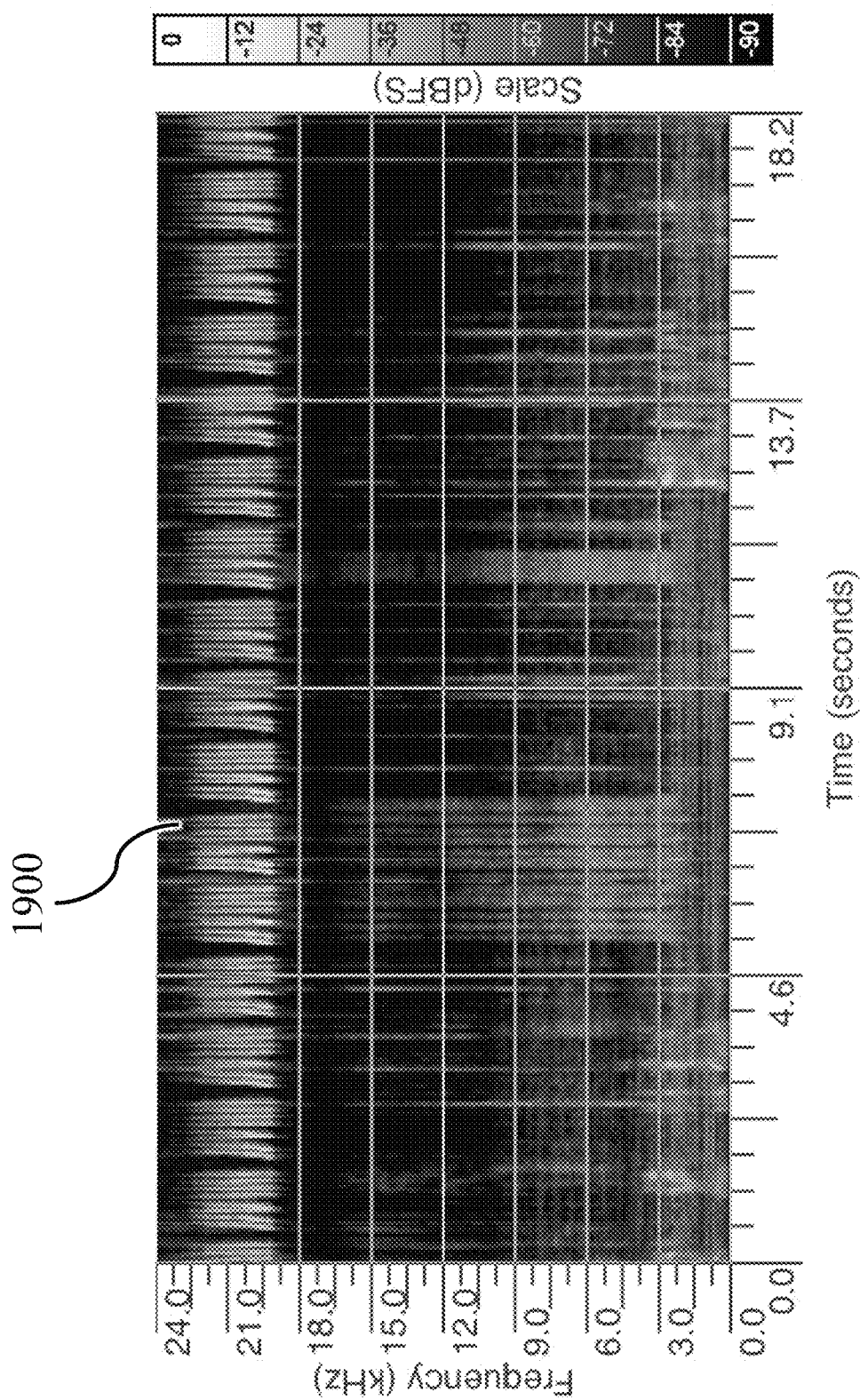
FIG. 19 shows a spectrogram of a captured signal on a mobile device.

The present method provides a mechanism for positioning, but can also be used as a communication channel to transfer content from a wide variety of audio-capable sources. These include, but are not limited to televisions, music broadcasts, movies, etc. This technique could provide targeted advertising content or proof-of-listening verification for interested stakeholders. FIG. 19 shows a spectrogram of the recorded system in a mall environment. The modulated data is shown in the top part of the frequency range (1900).

The following paragraph describes the system 1211 (FIG. 12), which represents the inverse to the system 107 (FIG. 1), where the transmitter(s) 1204 are mobile, and receivers 1201-1203 are stationary. In this configuration, the receiver(s) 1201-1203 receive and, if possible, demodulate the periodic signals 1212 sent from mobile transmitter device(s) 1204. Recording(s) of the signals 1212 or the demodulated data may be transferred over a network 1205 to a server 1206 or a transmitter 1204 for processing. The receiver(s) may be time synchronized to a time synchronization source 1200 so that they can determine the time difference of arrival of the signals 1212. A mapping between the locations of the receivers and their IDs may be stored on a server 1206 and/or on the mobile transmitter(s) 1204.

Figure 12:
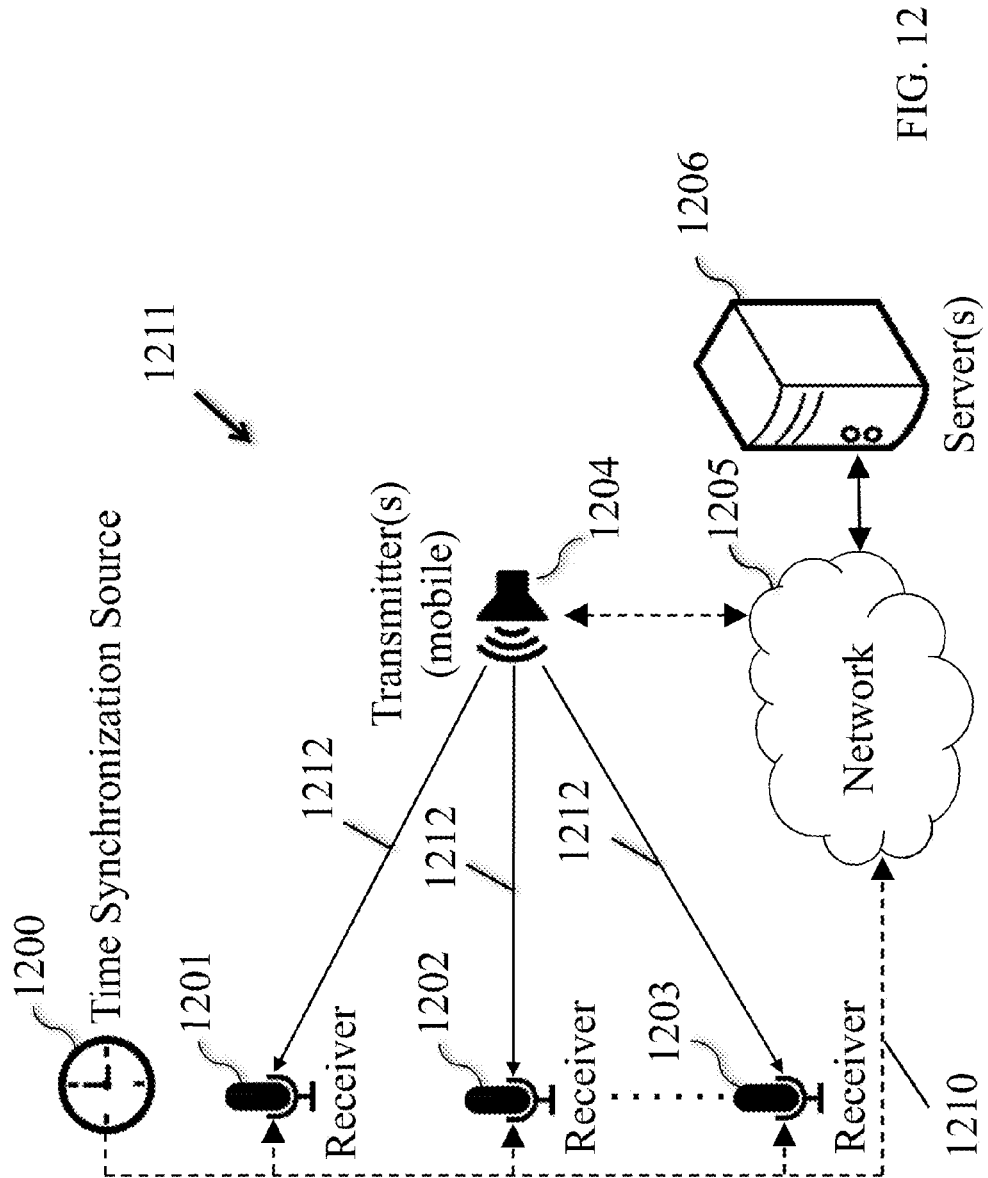
FIG. 12 illustrates an example of a mobile transmitter based system.

A possible hardware architecture for a transmitter 1204 is shown in FIG. 13A. A transmitter like 1204, may be comprised of the following components: a processor 1301, memory 1304, a clock 1302, an amplifier 1306 and a speaker 1307. The transmitter may also optionally include the following components: a network interface 1303, a thermometer 1308 and a Digital to Analog Converter (DAC) 1305. The processor 1301 is driven by the clock 1302 to run the internal circuitry and to keep a local notion of time. Processor 1301 has access to the memory 1304, which can be used for computations and to store parts of, or the entire ultrasound signal that is transmitted. Processor 1301 may be connected to network 1205 (FIG. 12) by network interface 1303, over which processor 1301 may synchronize to the time synchronization source 1200 (FIG. 12) and/or communicate with other transmitters 1204 or the servers 1206 (FIG. 12). The DAC 1305 is responsible for converting the digital representation of the ultrasound signal 1212 (FIG. 12), which is to be played back, into an analog signal. DAC 1305 passes this analog signal to the amplifier 1306, which broadcasts the analog signal over speaker 1307. Alternately, processor 1301 may also use a Pulse Code Modulation (PCM) interface to directly transfer data to the amplifier 1306 for playing back the ultrasound signal 108. The thermometer 1308 may supply processor 1301 with the current ambient temperature in order to calculate the speed of sound under current conditions in order to perform more accurate ranging.

A possible hardware architecture for a receiver 1201 is shown in FIG. 13B. A receiver such as 1201 may be comprised of: A processor 1310, memory 1313, a clock 1311, an Analog to Digital Converter (ADC) 1317 and a microphone 1318. The receiver 1201 may also include the following optional components: a network interface 1312, a digital to analog converter (DAC) 1314, an amplifier (1315), a speaker (1316) and a thermometer 1319. Processor 1310 is driven by the clock 1311 to run the internal circuitry and to keep an internal notion of time. The memory 1313 may be used for computation. The microphone 1318 receives ultrasound transmissions, which are then digitized by the ADC 1317 and passed to the processor 1310. The processor 1310 may then demodulate and decode the captured signals if it is capable of this, or transfer a recording of them to an external server 1206 (FIG. 12) or transmitter 1204 (FIG. 12) for demodulation and decoding using the network interface 1312. The transmitter 1201 may also coordinate with other transmitters 1202, 1203 (FIG. 12) through the network interface 1312 to determine the distances to each other. Processor 1310 determines these distances by measuring the propagation delay of an ultrasonic ranging signal sent to other transmitter(s) 1202, 1203 through the DAC 1314, amplifier 1315 and speaker 1316. Alternately to the DAC, the processor 1310 may also use Pulse Code Modulation (PCM) for interfacing with the amplifier 1315 to send the ranging signal. The receiver 1201 may receive the ranging signal with microphone 1318, which passes the signal to ADC 1317, which digitizes the signal and passes it to processor 1310 for processing. The thermometer 1319 may be used to measure the current ambient temperature in order to calculate the speed of sound under current conditions in order to perform more accurate ranging.

A possible software architecture for a transmitter 1204 is shown in FIG. 14A. A transmitter 1204 may be comprised of a localization and/or control algorithm 1401, a player 1404, a digital representation of the transmitter's ID 1405 and a digital representation of the modulated ultrasound data symbols used to encode the transmitter's ID or a method for modulating them 1406. The transmitter 1214 may also include the following optional components: a network stack 1402, a modulator 1403, a digital representation of the ambient temperature 1407, a local location database mapping the location of receivers to their IDs, and a location service output 1408. The localization and/or control algorithm 1401 may be used to receive the transmitter's ID over a network connection using the network stack 1402, or may be read from memory. The localization and/or control algorithm 1401 may then encode the transmitter's ID 1405 as an ultrasound waveform using the modulator 1403. Once the waveform is synthesized or a pre-synthesized waveform is read from memory, it may be transmitted using the player 1404. This transmission may be triggered by an internal or external synchronization signal, which may be received by the network stack 1402 and then passed to the localization and control algorithm 1401. The local location database 1409 stores a mapping between the locations of a subset or all receivers 1201-1203 (FIG. 12) and their respective IDs and may be populated by the localization and/or control algorithm 1401 receiving this data over the network stack 1402. The calculation of the position of the transmitter 1204 may also be performed by the localization and/or control algorithm 1401, or it may be outsourced to server 1206 (FIG. 12) by transmitting the demodulated receiver IDs with the time-offsets of their respective preambles and their amplitudes over the network stack 1402. The location service 1408 may provide an interface to applications for obtaining the current location of the transmitter 1204, which is provided by the localization and/or control algorithm 1401. If location processing is outsourced, the localization and/or control algorithm 1401 may need to receive the calculated position of the transmitter 1204 from server(s) 1206 through the network stack 1402.

A possible software architecture for a receiver 1201 is shown in FIG. 14B. A transmitter may be comprised of a ranging and/or control algorithm 1409, a player 1412, a digital representation of the receiver's ID 1415 and a digital representation of the modulated ultrasound data symbols used to encode the transmitter's ID(s) 1416. The receiver 1201 may also include the following optional components: a network stack 1410, a modulator 1411, a recorder 1413, a demodulator 1414 and a digital representation of the current ambient temperature 1417. The ranging and/or control algorithm 1409 may be used to receive the receiver's ID over a network connection using the network stack 1410, or may be read from memory. The ranging and/or control algorithm 1409 may use the recorder 1413 to receive ultrasound transmissions from a subset or all transmitters 1203 (FIG. 12). Recording may be triggered by an internal clock or an external time synchronization source 1200 (FIG. 12). The demodulator 1414 may be used to demodulate the recorded transmissions if the processor 1310 (FIG. 13) is capable of doing so. The demodulator 1414 uses the symbols 1416 as templates in pattern matching and processing techniques mentioned herein to demodulate the ultrasound transmissions. The ranging and/or control algorithm 1409 may also outsource demodulation of captured ultrasound signals to server(s) 1206 (FIG. 12) by transmitting them along with its ID over the network stack 1410. The receiver 1201 may also support ranging to other transmitters 1202-1203 (FIG. 12) by performing time of flight ranging using the ranging and/or control algorithm 1409, the network stack 1410 for time synchronizing with other transmitters, the player 1412 and optionally the modulator 1411 for transmitting an ultrasound ranging signal to other transmitters and the recorder 1413 and demodulator 1414 for receiving ultrasound ranging signals from other transmitters. The temperature value 1417 may be used to calculate the speed of sound under current conditions in order to perform more accurate ranging between transmitters, or may be transmitted to other parts of the system to perform more accurate ranging there.

FIG. 16-A illustrates the method run in full or in part by the transmitter(s) 1204 (FIG. 12) of system 1211 to determine their location. The following steps may be performed by the transmitter(s) 1204 or by the server 1206 (FIG. 12). Although there may be a plurality of transmitters 1204, transmitting simultaneously in the system, the following paragraph will describe the method as run by a single transmitter. Initially, as shown in 1601, the transmitter 1204 may be assigned an ID either manually or automatically, which it can then load from local memory. The ID can then be converted into an encoded data sequence 1602 by applying a Hamming, Golay, Reed Solomon or other error correcting code to form a data packet as shown in 1000 and 1003 (FIG. 10). Further encoding to compress the data sequence and/or adding additional information is also possible. Next an ultrasonic waveform containing the formed data sequence can be generated 1603. This can be done by modulating the data sequence into a waveform as described herein, or by concatenating already modulated symbols as shown in FIG. 6-9. If the waveform is generated externally to the transmitter 1204, it can be transmitted to it over the network 1205 and stored in its local memory. The following steps are performed on the transmitter 1204: The transmitter 1204 may load its ultrasound waveform from memory and transmit it periodically, according to an internal or external trigger 1604-1605. The transmitter 1204 may be synchronized to an external time synchronization source 1200 over the network 1205 to make use of TDMA multiplexing as shown in FIG. 11 and described herein.

FIG. 16-B illustrates the method run in full or in part by each receiver 1201-1203 (FIG. 12) of system 1211 (FIG. 12) to localize a single or a plurality of transmitters 1204 (FIG. 12). Although there may be a plurality of transmitters 1204 as well as receivers 1201-1203, transmitting simultaneously in the system, the following paragraph will describe the method as run to localize a single transmitter using a single receiver. The following paragraph only describes a scenario where the receiver 1201 is not synchronized. Initially (1606) the receiver 1201 may load its ID from local memory. The receiver 1201 may then record the ultrasonic signal 1212 (FIG. 12) at a constant rate, which was transmitted by the transmitter 1204. If the receiver 1201 is configured to have the original transmitter 1204 demodulate and decode the signal 1212 (1608), it can transfer the recording along with its ID to the transmitter 1204 using network 1205 as described in 1609. Otherwise the recording and receiver ID may be transmitted to the server 1206 over the network 1205 for demodulation and decoding (1614). The device performing the demodulation and decoding can now proceed to demodulate and decode the received ultrasound signal (1212) contained in the recording as detailed in FIG. 18 (1610/1615) to extract the transmitter ID, and the signal strength corresponding to the preambles of the modulated transmitter ID. If non-recoverable errors were encountered in 1610/1615, the device performing the demodulation and decoding can discard the recording, receiver ID as well as any demodulation and decoding results and wait for later transmissions from the receiver 1201. If the transmitter ID was decoded without errors (1611/1616), the device performing the demodulation and decoding can continue on to 1612/1617. If the device that performed the demodulation and decoding is the server 1206 and the calculation of the location of the transmitter 1204 is to be performed by the transmitter 1204 as described in 1612, the server 1206 transmits the decoded transmitter ID, corresponding receiver ID and signal strength of the corresponding ultrasound signal to the transmitter 1204. If the device that performed the demodulation and decoding is the transmitter 1204 and the calculation of the location of the transmitter 1204 is to be performed by the server 1206 as described in 1617, the transmitter 1204 transmits the decoded transmitter ID, corresponding receiver ID and signal strength of the corresponding ultrasound signal to the server 1206. The device performing the location calculation can load a mapping between the decoded receiver ID and the location of the receiver 1201. This mapping may be fetched from local memory (if present) (1619), or from server 1206 over the network 1205 as described in 1620. The zone-based location of the transmitter 1204 may now be calculated as described herein (1621). The outputs 1622 of this method are the location of the transmitter 1204 in form of coordinates or another identifier, which can be mapped to a location as well as any errors that were encountered while executing the method.

The method as detailed in FIG. 16-B may also be run by a plurality of receivers 1201-1203 to localize a single or plurality of transmitter(s) 1204. In this case the receivers may demodulate a plurality of ultrasonic signals, sent by the transmitters 1204 to the receivers 1201-1203. The decoded transmitter ID(s), corresponding signal strength(s) and ID(s) of the receiving receivers 1201-1203 may then be accumulated by the device performing the location calculation and used to supplement the location calculation.

FIG. 17 illustrates the method run in full or in part by each receiver 1201-1203 (FIG. 12) of system 1211 (FIG. 12) to localize a single or a plurality of transmitters 1204 (FIG. 12). The following paragraph only describes a scenario where the receivers 1201-1203 are synchronized to a time synchronization source 1200. Initially (1700) each receiver 1201-1203 may load its ID from local memory. The receivers may attempt to synchronize to the time synchronization source 1200 until successful (1701-1702). Each receiver 1201-1203 may then synchronously record the ultrasonic signals 1212 (FIG. 12) (and additional ultrasonic signals from other transmitters) at a constant rate. If a receiver 1201-1203 is configured to have a transmitter 1204 demodulate and decode the ultrasonic signal(s) 1212 (1704), it can transfer its recording along with its ID to a transmitter 1204 using network 1205 as described in 1705. Otherwise, its recording and receiver ID may be transmitted to the server 1206 over the network 1205 for demodulation and decoding (1710). Each device performing the demodulation and decoding may receive multiple recordings from a plurality of transmitters. A device performing the demodulation and decoding can now proceed to demodulate and decode the received ultrasound signal(s) contained in the recording(s) as detailed in FIG. 18 (1707/1712) to extract the transmitter ID(s) and time offsets of the corresponding preamble(s). If non-recoverable errors were encountered in 1707/1712, a device performing the demodulation and decoding can discard the recording(s), receiver ID(s) as well as any demodulation and decoding results and wait for later transmissions from the receiver(s) 1201-1203. If the transmitter ID was decoded without errors (1707/1712), a device performing the demodulation and decoding can continue on to 1708/1713. For each device that performed the demodulation and decoding, if it is the server 1206 and the calculation of the location of the transmitter(s) 1204 is to be performed by the same transmitter as described in 1714, the server 1206 transmits the decoded transmitter ID(s), corresponding receiver ID(s) and time offset(s) of the corresponding ultrasound signal(s) to that transmitter. If the device that performed the demodulation and decoding is a transmitter 1204 and the calculation of the location of the transmitter 1204 is to be performed by the server 1206 as described in 1709, the transmitter 1204 transmits the decoded transmitter ID(s), corresponding receiver ID(s) and time offset(s) of the corresponding ultrasound signal(s) to the server 1206. A device performing the location calculation needs to accumulate enough data sets corresponding to a single transmitter ID, consisting of different receiver IDs and time offsets to perform TDOA ranging within a finite amount of time (1715). Once these are acquired, the device performing the location calculation can load a mapping between the decoded receiver IDs and the location of the receiver 1201. This mapping may be fetched from local memory (if present) (1716), or from server 1206 over the network 1205 as described in 1717. The location of the transmitter 1204 may now be calculated using the time difference of arrival of the time offsets as described herein (1718). The outputs 1719 of this method are the location of the transmitter 1204 in form of coordinates or another identifier, which can be mapped to a location as well as any errors that were encountered while executing the method. The outputs can be mapped back to the correct transmitter through the accompanied transmitter ID.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method for locating a mobile device comprising the method steps of:
    modulating an ultrasound signal with i. one or more symbols capable of Pulse Compression, and ii. a fade-in preceding each symbol of the one or more symbols and a fade-out following the each symbol of the one or more symbols or a fading function applied to the each symbol of the one or more symbols;
    transmitting the modulated ultrasound signal in a frequency range from about 19 to 24 KHz from a transmitter;
    receiving the modulated ultrasound signal using at least one mobile device;
    demodulating the modulated ultrasound signal to form a demodulated ultrasound signal,
        wherein at least one symbol of the demodulated ultrasound signal denotes the time of arrival of the modulated ultrasound signal;
    extracting the time of arrival from the demodulated ultrasound signal; and
    obtaining the transmitter identifier of the transmitter associated with received modulated ultrasound signal;
    looking up the transmitter identifier in a transmitter map to determine the location of the transmitter; and
    determining the location of the mobile device based on the transmitter location and the time of arrival.

2. The method according to claim 1, wherein:
    the step of modulating the ultrasonic signal further comprises modulating the ultrasound signal with i. a preamble capable of Pulse Compression, and ii. either a fade-in preceding the preamble and a fade-out following the preamble or a fading function applied to the preamble;
    the demodulating step comprises the step of matched filtering only the preamble to cross correlate the preamble with a preamble template to form the demodulated ultrasound signal; and
    extracting the preamble to characterize a transmission channel and
    estimate a distance between the device and the transmitter.

3. The method according to claim 2, wherein the demodulating step comprises the step of matched filtering the preamble and the one or more symbols to cross correlate the preamble with a preamble template and the one or more symbols with a symbols template to form the demodulated ultrasound signal.

4. The method according to claim 1, wherein the demodulating step comprises the step of matched filtering only the one or more symbols to cross correlate the one or more symbols with a symbols template to form the demodulated ultrasound signal.

5. The method according to claim 1, wherein the demodulating step comprises the step of Fractional Fourier Analysis to form the demodulated ultrasound signal.

6. The method according to claim 1, wherein the demodulating step further comprises the step of Successive Interference Cancellation to form the demodulated ultrasound signal.

7. The method according to claim 1, wherein:
obtaining the transmitter identifier and time of arrival further comprises extracting a signal strength of the modulated ultrasound signal; and
the step of determining the location of the mobile device based on the signal strength.

8. The method according to claim 1, wherein the mobile device is selected from the group consisting of a smartphone, a laptop computer, and a tablet.

9. The method according to claim 1, wherein the step of transmitting the modulated ultrasound signal is performed by a plurality of mobile devices.

10. The method according to claim 9, further comprising:
a step of transferring the modulated ultrasonic signal and a receiver identifier to a processor for demodulation; and
the step of determining the location of the mobile device based on the transmitter identifier and the receiver identifier.

11. The method according to claim 1, wherein the step of transmitting the modulated ultrasound signal is performed by a mobile device.

12. The method according to claim 11, further comprising:
a step of transferring the modulated ultrasonic signal and a receiver identifier to a processor for demodulation; and
the step of determining the location of the mobile device based on the transmitter identifier and the receiver identifier.

13. The method of claim 1, wherein the modulated ultrasound signal further comprises a transmitter identifier.

14. The method of claim 1, wherein the transmitter identifier is determined from the time of arrival and a transmission schedule.

15. The method of claim 1, further comprising:
transmitting an additional modulated ultrasound signal from at least one additional transmitter,
wherein transmission of the modulated ultrasound signals is according to a time schedule,
wherein the location of the mobile device is determined by calculating the time differences of arrival of the demodulated ultrasound signals from each of their times of arrival and performing multilateration.

16. The method of claim 1, further comprising:
transmitting an additional modulated ultrasound signal from at least one additional transmitter,
wherein the location of the mobile device is determined by calculating the times of flight of the demodulated ultrasound signals from each of their times of arrival and each of their times of transmission and performing trilateration.

17. The method of claim 1, wherein the location of the mobile device is determined by calculating the time of flight of the demodulated ultrasound signal from its time of arrival with respect to its time of transmission.

* * * * *